(12) United States Patent
Kitahara

(10) Patent No.: US 11,391,434 B2
(45) Date of Patent: Jul. 19, 2022

(54) LIGHTING DEVICE, VEHICLE, AND METHOD OF CASTING LIGHT

(71) Applicant: NICHIA CORPORATION, Anan (JP)

(72) Inventor: Wataru Kitahara, Kamiina-gun (JP)

(73) Assignee: Nichia Corporation, Anan (JP)

( * ) Notice: Subject to any disclaimer, the term of this patent is extended or adjusted under 35 U.S.C. 154(b) by 0 days.

(21) Appl. No.: 17/314,242

(22) Filed: May 7, 2021

(65) Prior Publication Data

US 2021/0372586 A1 Dec. 2, 2021

(30) Foreign Application Priority Data

May 29, 2020 (JP) .............................. JP2020-094183

(51) Int. Cl.
| F21S 41/675 | (2018.01) |
| F21V 7/08 | (2006.01) |
| F21S 41/32 | (2018.01) |

(52) U.S. Cl.
CPC ........... *F21S 41/675* (2018.01); *F21S 41/321* (2018.01); *F21V 7/08* (2013.01)

(58) Field of Classification Search
CPC ....... F21S 41/675; F21V 14/04; F21V 14/045
See application file for complete search history.

(56) References Cited

U.S. PATENT DOCUMENTS

| 2015/0204503 A1 | 7/2015 | Krenn et al. |
| 2015/0307018 A1 | 10/2015 | Shibata et al. |
| 2016/0341390 A1 | 11/2016 | Yamamura et al. |
| 2018/0043820 A1 | 2/2018 | Murakami et al. |
| 2019/0003680 A1 | 1/2019 | Gouda et al. |
| 2019/0009705 A1* | 1/2019 | Tanaka .................... B60Q 1/076 |
| 2019/0145599 A1* | 5/2019 | Kogure ................ B60Q 1/1407 362/514 |
| 2020/0158307 A1 | 5/2020 | Kanamori |

FOREIGN PATENT DOCUMENTS

| CN | 111237714 A * | 6/2020 | ............. B60Q 1/143 |
| JP | 2015-525952 A | 9/2015 | |
| JP | 2015-209002 A | 11/2015 | |
| JP | JR 2016-193689 A | 11/2016 | |
| JP | JR 2018-177090 A | 11/2018 | |
| JP | 2019-12091 A | 1/2019 | |
| JP | 2020-55516 A | 4/2020 | |
| JP | 2020-114739 A | 7/2020 | |
| WO | WO 2015/122303 A1 | 8/2015 | |
| WO | WO 2016/167250 A1 | 10/2016 | |
| WO | WO 2019/021913 A1 | 1/2019 | |

* cited by examiner

*Primary Examiner* — Sean P Gramling
(74) *Attorney, Agent, or Firm* — Birch, Stewart, Kolasch & Birch LLP

(57) ABSTRACT

An lighting device 100 includes a light source, a reflector, an actuator, and a controller. The reflector has a first reflection surface that is concave recessed toward a direction away from the light source and is configured to receive light emitted from the light source. The actuator is configured to rotate the reflector with an axis passing through the light source being a rotation axis. The controller is configured to keep the light source on over a time shorter than a rotation period of the reflector according to a rotation angle of the reflector while controlling the actuator to rotate the reflector. A casting direction of light emitted from the first reflection surface is inclined with respect to an extension direction of the rotation axis.

17 Claims, 20 Drawing Sheets

LIGHTING DEVICE, VEHICLE, AND METHOD OF CASTING LIGHT

CROSS-REFERENCE TO RELATED APPLICATION

This application claims priority to Japanese Patent Application No. 2020-094183, filed on May 29, 2020, the disclosure of which is hereby incorporated by reference in its entirety.

BACKGROUND

Certain embodiments relate to an lighting device, a vehicle, and a method of casting light.

Lighting devices that are installed in vehicles and cast light on a road surface to form patterns have been developed in recent years. There is a demand that such a lighting device should be actualized using a small number of parts. See, for example, Patent Publication WO 2014/008523.

SUMMARY

An object of the present embodiments is therefore to provide an lighting device and a vehicle that can form a pattern on a surface using a small number of parts, and a method of casting light.

A lighting device according to an embodiment includes a light source, a reflector, an actuator, and a controller. The reflector has a first reflection surface that is curved in a concave shape, and is configured to receive light emitted from the light source. The actuator is configured to rotate the reflector with an axis passing through the light source being a rotation axis. The controller is configured to keep the light source on over a time shorter than a rotation period of the reflector according to a rotation angle of the reflector while controlling e actuator to rotate the reflector. A casting direction of light emitted from the first reflection surface is inclined with respect to an extension direction of the rotation axis.

A vehicle according to an embodiment includes the lighting device.

A method of casting light according to an embodiment includes
keeping a light source on over a time shorter than a rotation period of a reflector according to a rotation angle of the reflector while rotating the reflector with an axis passing through the light source being a rotation axis. The reflector has a first reflection surface that is curved in a concave shape and configured to receive light emitted from the light source. In the step of keeping a light source on, a casting direction of light emitted from the first reflection surface is inclined with respect to an extension direction of the rotation axis.

These embodiments can provide a lighting device and a vehicle that can form a pattern on a pattern surface using a small number of parts, and a method of casting light.

DETAILED DESCRIPTION OF EMBODIMENTS

First Embodiment

A first embodiment is first described.

Figure 1:
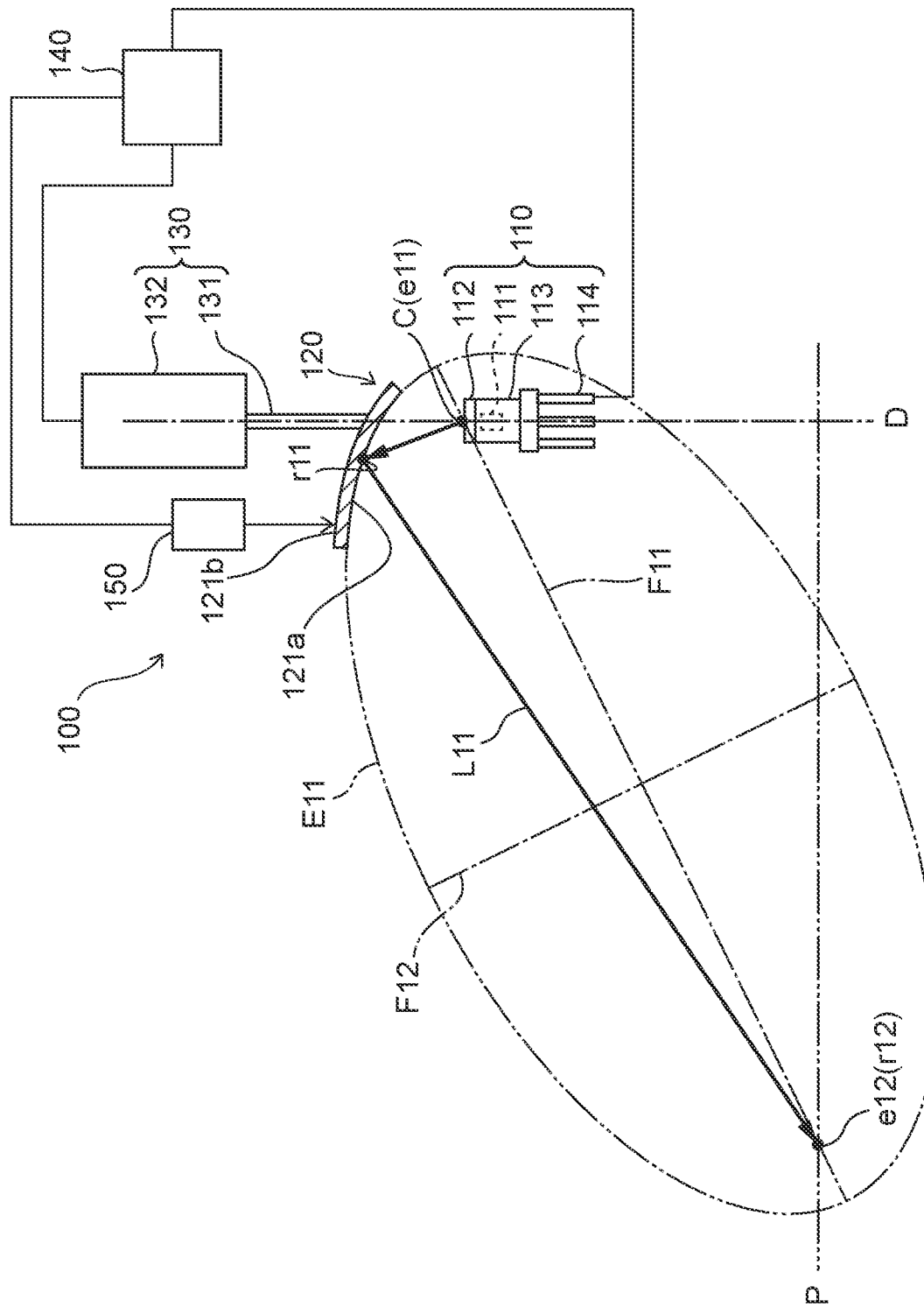
FIG. 1 is a schematic partial cross-sectional view of an lighting device according to a first embodiment.

FIG. 1 is a schematic partial cross-sectional view of an lighting device according to the present embodiment.

Figure 2:
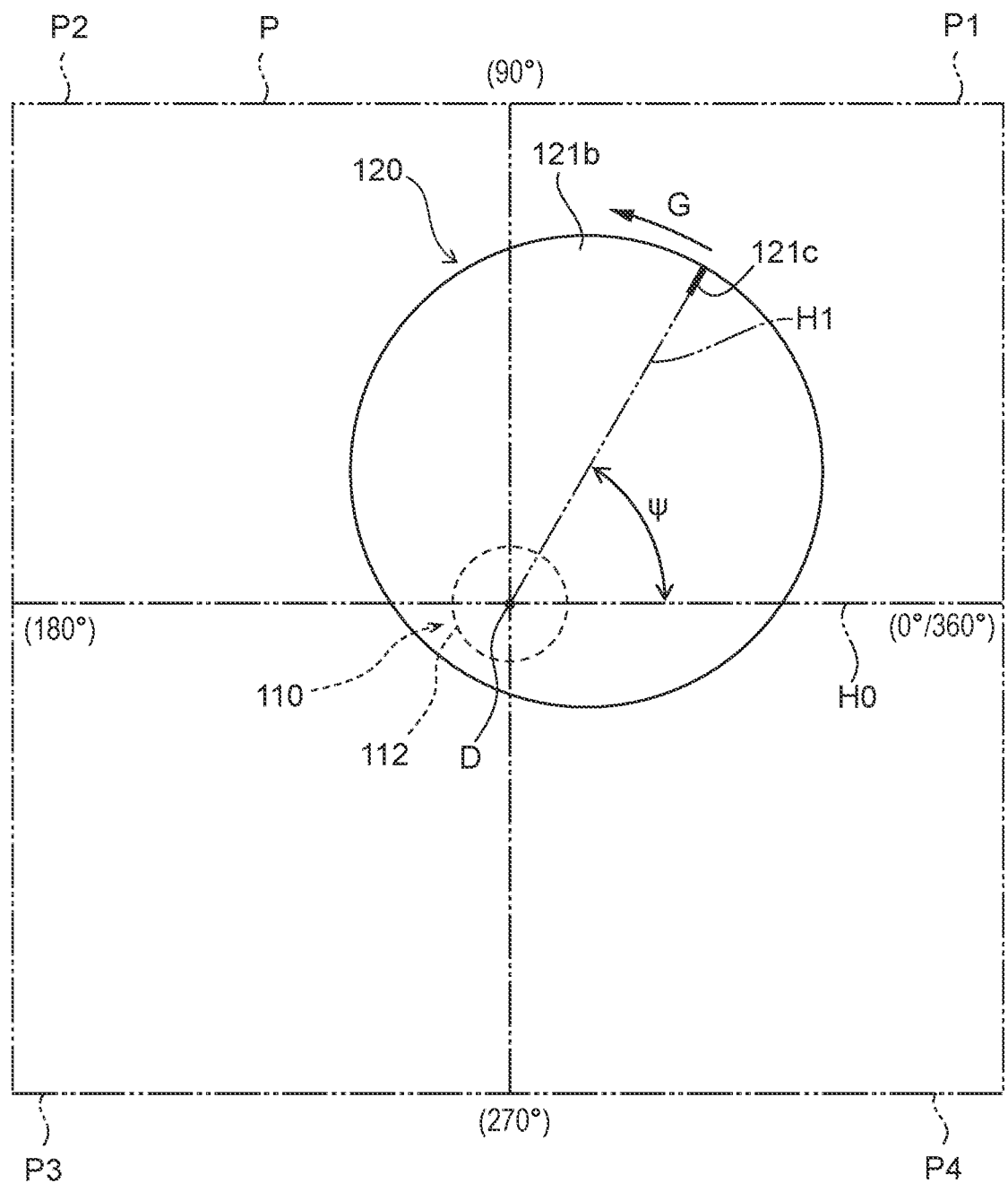
FIG. 2 is a schematic top view of a light source and a reflector in the lighting device.

FIG. 2 is a schematic top view of a light source and a reflector in the lighting device.

Figure 3:
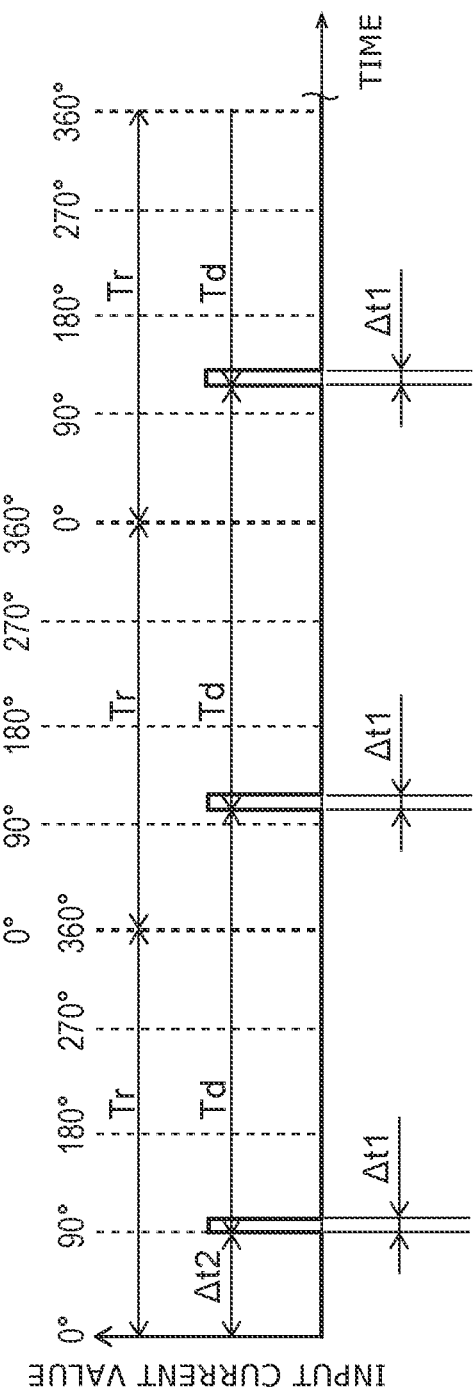
FIG. 3 is a graph showing input signals applied to the light source, with time on the horizontal axis and input current value on the vertical axis.

FIG. 3 is a graph showing input signals applied to the light source, with time on the horizontal axis and input currentvalue on the vertical axis.

An lighting device 100 according to the present embodiment includes a light source 110, a reflector 120, an actuator 130, and a controller 140.

The reflector 120 has a reflection surface 121a that is concave recessed toward a direction away from the light source 110 and configured to receive light emitted from the light source 110. The reflection surface 121a corresponds to a first reflection surface. The actuator 130 can rotate the reflector 120 with an axis passing through the light source 110 being a rotation axis D. The controller 140 controls the actuator 130 to rotate the reflector 120 and keeps the light source 110 on over a time Δt1 shorter than a rotation period Tr of the reflector 120 according to a rotation angle ψ of the reflector 120. A casting direction a light L11 emitted from the reflection surface 121a is inclined with respect to an extension direction of the rotation axis D. The expression "light emitted from the reflection surface" as used in the present specification refers to light reflected at the reflection surface.

Each part of the lighting device 100 is described below in detail. Hereinafter, a direction from the light source 110 to the reflector 120 is hereinafter referred to as the "upward direction", and the opposite direction is referred to as the "downward direction".

The light source 110 includes a light-emitting element 111 and a wavelength conversion member 112 that is disposed on or above the light-emitting element 111 anal configured to perform wavelength conversion of light emitted from the light-emitting element 111 as shown in FIG. 1.

For example, the light-emitting element 111 is a laser diode (LD). The light-emitting element 111 emits, for example, blue light. The light-emitting element 111 is housed in a casing 113.

A light-transmissive member is disposed on e upper surface of the casing 113 and transmits at least a portion of light emitted from the light-emitting element 111. The wavelength conversion member 112 is disposed on the light-transmissive member of the casing 113. Terminals 114 electrically connected to the light-emitting element 111 are disposed on the lower surface of the casing 113. The terminals 114 are electrically connected to the controller 140.

For example, the wavelength conversion member 112 contains a phosphor. For example, the wavelength conversion member 112 absorbs blue light emitted from the light-emitting element 111 to emit yellow light. The light source 110 emits white light as a mixture of blue light emitted from the light-emitting element 111 and yellow light emitted from the wavelength conversion member 112. Any appropriate structure of the light source other than the above structure can be employed. For example, the color of light emitted from the light-emitting element, the color of light emitted from the wavelength conversion member, and the color of light emitted from the light source are not limited to the above colors.

The wavelength conversion member 112 has a circular shape in a top view as shown in FIG. 2 in the present embodiment. The shape of the wavelength conversion member 112 in a top view is not limited to the above shape and may be a polygonal shape such as a quadrangular shape. The light source 110 is disposed such that a center C of the wavelength conversion member 112 in a top view is located on the rotation axis D as shown in FIG. 1. The center of the wavelength conversion member does not have to be located on the rotation axis.

The reflector 120 is disposed above and away from the light source 110. The reflector 120 is formed of a material such as metal and resin, and a reflective coating can be provided on the reflection surface. The reflective coating is formed of, for example, a metal material such as aluminum or a dielectric film. The reflector 120 is curved in a concave shape recessed toward the direction away from the light source 110. The reflector 120 has a substantially circular shape in a top view as shown in FIG. 2.

The front surface of the reflector 120 corresponds to the lower surface as shown in FIG. 1, and the reflector 120 has the reflection surface 121a that receives light emitted from the light source 110 and an upper surface 121b opposite to the reflection surface 121a.

In the present embodiment, the reflection surface 121a is a portion of a surface obtained by rotating a curved line E11 concave recessed toward the direction away from the light source 110 with an axis F11 being the central axis. The axis F11 extends in a direction inclined with respect to the rotation axis D.

The curved line E11 forms an ellipse having a major axis (corresponding to the axis F11, which is the central axis of the curved line E11 in the present embodiment) and a minor axis F12 extending in directions inclined with respect to the extension direction of the rotation axis D. In this case, the reflection surface 121a has the shape of a portion of a spheroid. The shape of the curved line is not limited to the above shape. For example, the curved line may be a parabola. In this case, the reflection surface has the shape of a portion of a paraboloid of revolution.

A surface on which a pattern is formed by casting light emitted from the reflector 120 is hereinafter referred to as a "pattern surface P". An example is described below in which the pattern surface P is a flat surface orthogonal to the extension direction of the rotation axis D. The pattern surface does not have to be a flat surface. For example, in the case in which the lighting device 100 is installed in a vehicle, a projecting, depressing or curved road surface corresponds to the pattern surface P.

The reflection surface 121a is set such that the light L11 emitted from the reflection surface 121a is condensed on the pattern surface P. Specifically, for example, the reflection surface 121a is disposed along an ellipse having one focus e11 on the light source 110 and the other focus e12 located on the pattern surface P and away from the light source 110. The light L11 emitted from the reflection surface 121a is therefore condensed on the focus c12. That is, a center r12 of the light L11 emitted from the reflection surface 121a on the pattern surface P is located on the focus e12. The focus e11 is located on the rotation axis D, and the focus e12 is located away from the rotation axis D.

A direction from a center r11 of the reflection surface 121a to the center r12 of the light L11 cast on the pattern surface P in a section including the rotation axis D and the center r12 of the light L11 emitted from the reflection surface 121a on the pattern surface P as shown in FIG. 1 is hereinafter referred to as a "casting direction". A casting direction of the light L11 emitted from the reflection surface 121a is inclined with respect to the rotation axis D.

The upper surface 121b has the shape formed by shifting the reflection surface in the upward direction by the thickness of the reflector 120. A mark 121c used for detection of the rotation angle ψ of the reflector 120 is made on the upper surface 121b in the present embodiment as shown in FIG. 2. For example, the mark 121c is located on a straight line passing through the rotation axis D and the focus e12 in a top view.

The actuator 130 includes a shaft 131 attached to the reflector 120 and a motor 132 that rotates the shaft 131 as shown in FIG. 1. The shaft 131 is attached to the reflector 20 such that the rotation axis D deviates from the center r11 of the reflection surface 121a.

An example is described below in which a rotational direction G of the reflector 120 is a counterclockwise direction as seen from above as shown in FIG. 2. The rotational direction of the reflector may be a clockwise direction as seen from above. A reference line H0 is orthogonal to the rotation axis D. A straight line H1 connects a reference position, that is located on the reflector 120 and is positioned away from the rotation axis D, and the rotational axis D. The angle ψ in the rotational direction in a top view defined by the reference line H0 and the straight line H1 is simply referred to as the "rotation angle ψ". The reference position is, for example, the position of the mark 121c. Accordingly, the pattern surface P is divided into, for example, a first quadrant P1 in which the rotation angle ψ is larger than 0° and smaller than 90°, a second quadrant P2 in which the rotation angle ψ is larger than 90° and smaller than 180°, a third quadrant P3 in which the rotation angle ψ is larger than 180° and smaller than 270°, and a fourth quadrant P4 in which the rotation angle ψ is larger than 270° and smaller than 360°.

In the present embodiment, the lighting device 100 further includes a detector 150. The detector 150 is used to estimate the rotation angle ψ of the reflector 120. The detector 150 is disposed above the reflector 120 and detects the timing when the mark 121c has reached a predetermined position. An example is described below in which the detector 150 detects the timing when the mark 121c has reached the reference line H0, that is, the timing when the rotation angle ψ becomes 0°.

The controller 140 includes a processor such as an electronic control unit (ECU) and a memory. The controller 140 is electrically connected to the light source 110, the actuator 130, and the detector 150 to control these components.

Subsequently, operation of the lighting device 100 is described.

Figure 4:
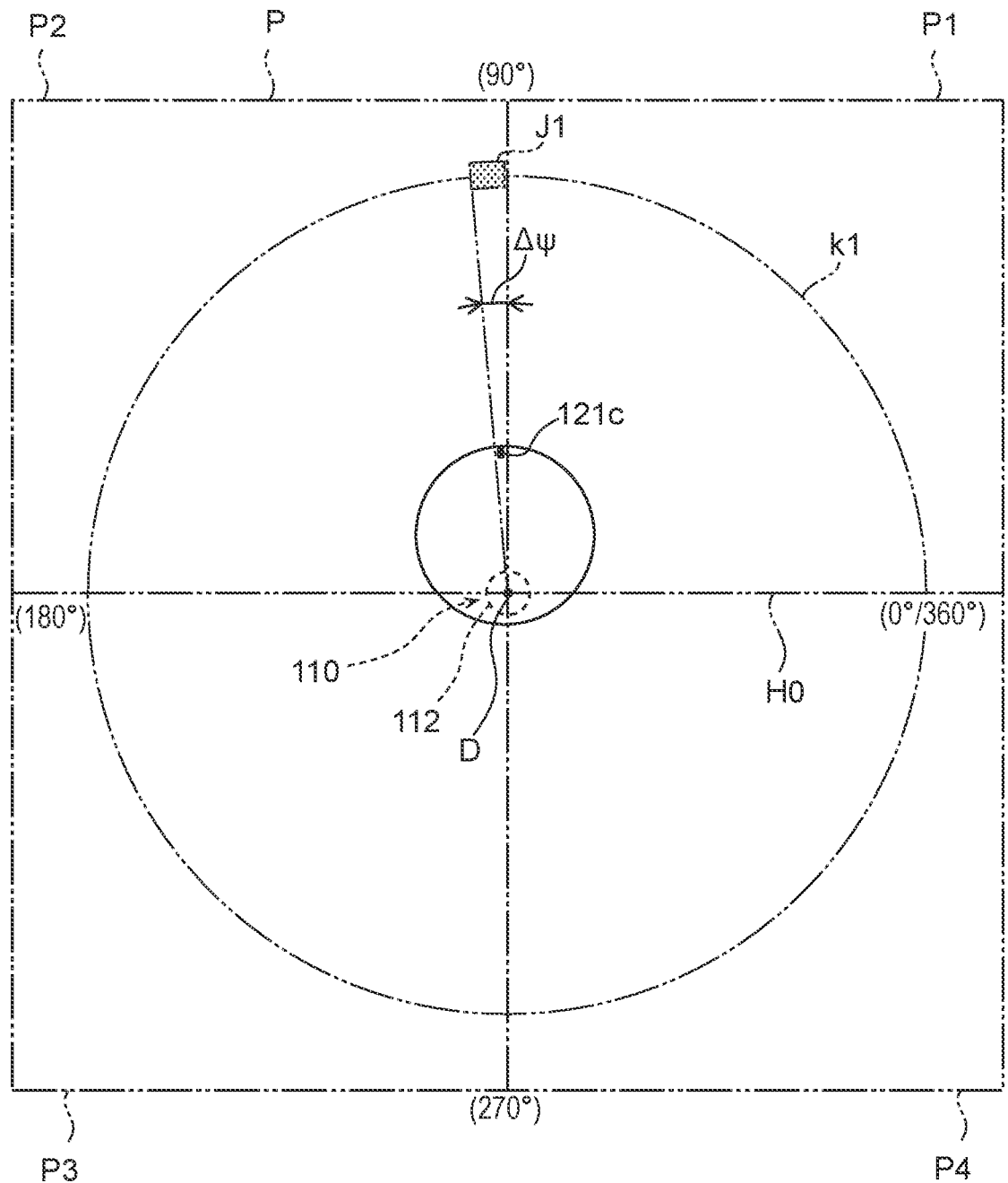
FIG. 4 is a schematic top view of light emitted from the lighting device.

FIG. 4 is a schematic top view of light emitted from the lighting device.

Figure 5:
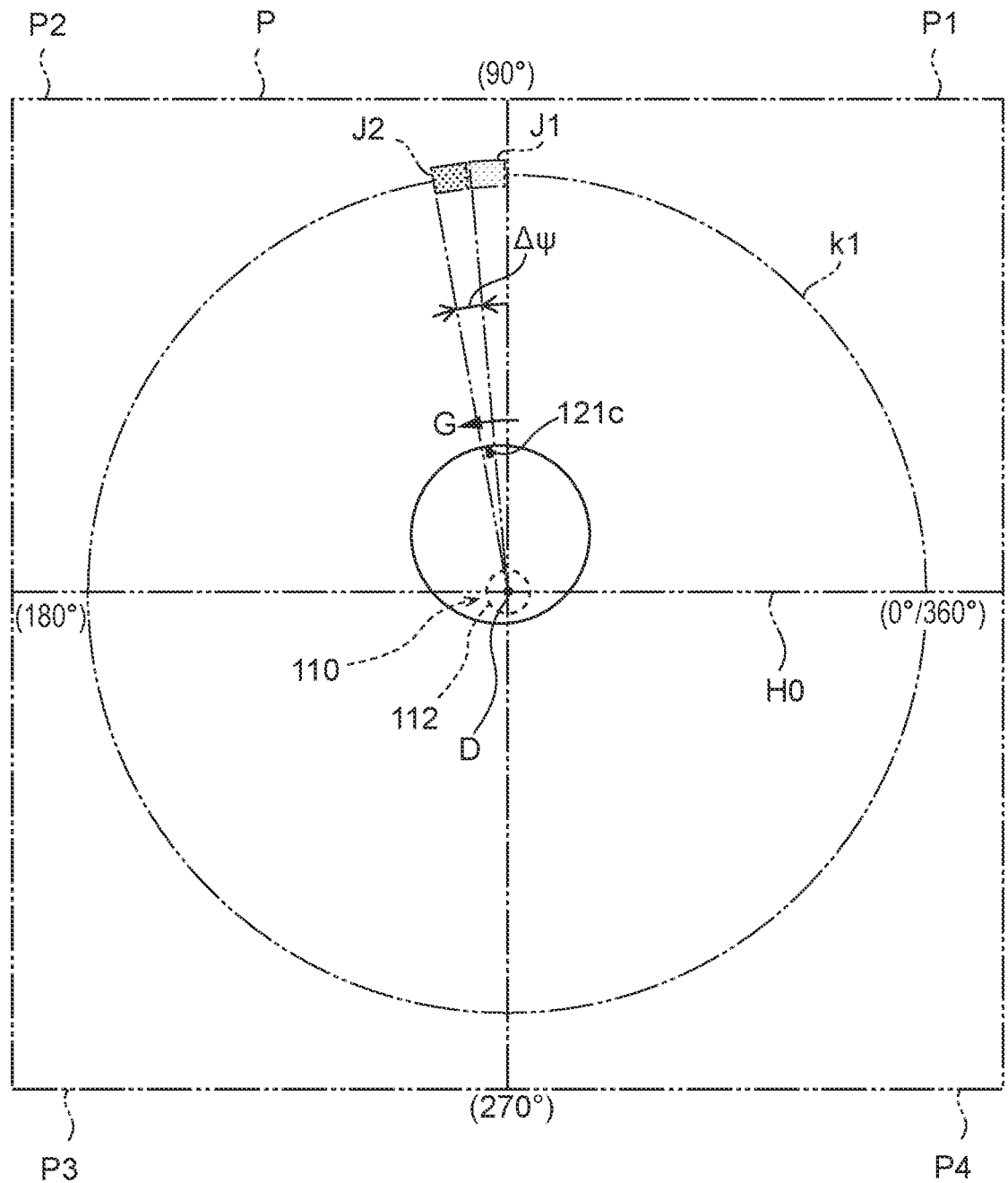
FIG. 5 is a schematic top view of light emitted from the lighting device when the reflector has been rotated from the state shown in FIG. 4.

FIG. 5 is a schematic top view of light emitted from the lighting device when the reflector has been rotated from the state shown in FIG. 4.

Figure 6:
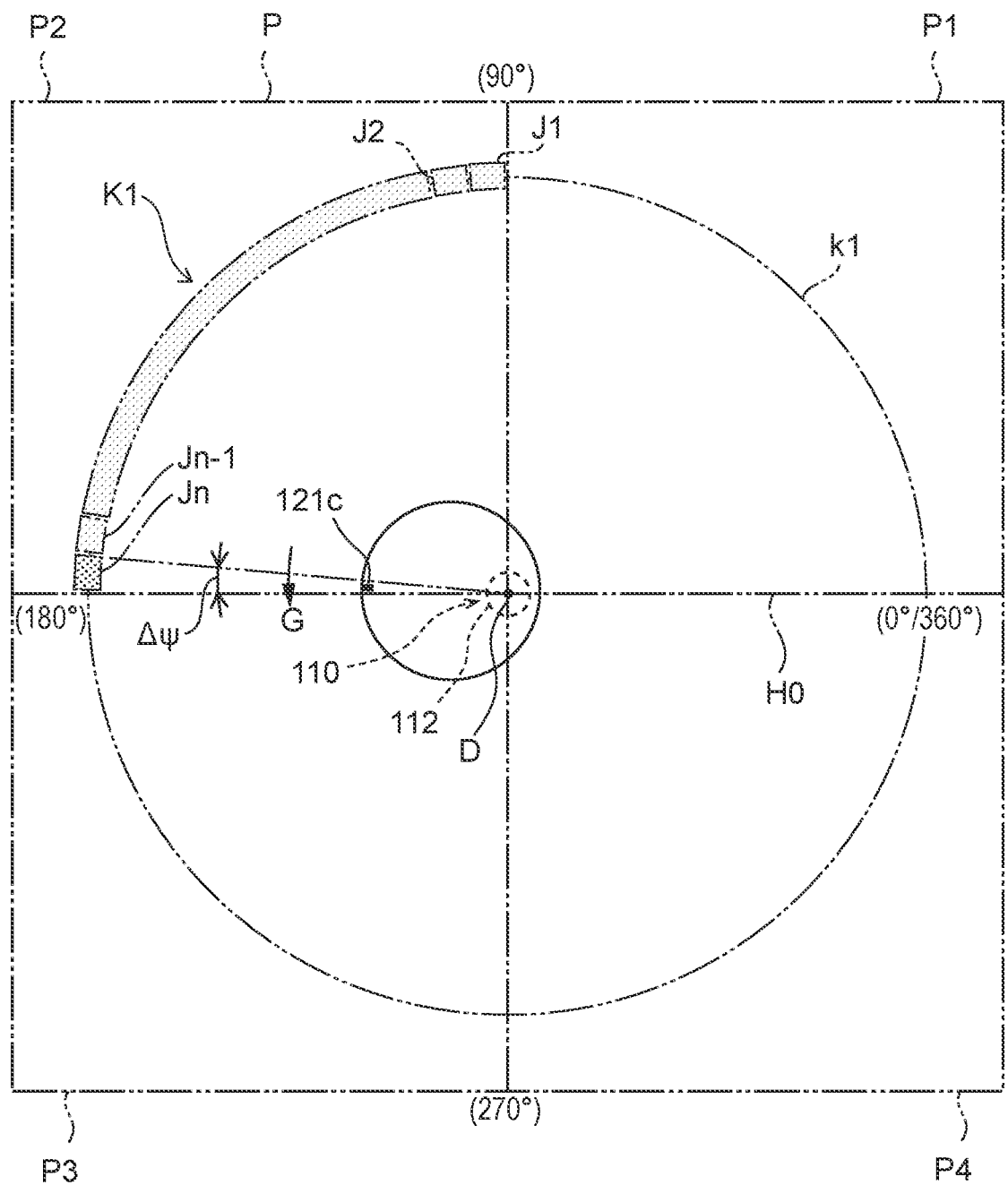
FIG. 6 is a schematic top view of light emitted from the lighting device when the reflector has been further rotated from the state shown in FIG. 5.

FIG. 6 is a schematic top view of light emitted from the lighting device when the reflector has been further rotated from the state shown in FIG. 5.

The controller 140 controls the actuator 130 to rotate the reflector 120 at the rotation period Tr as shown in FIG. 3.

Subsequently, after a predetermined time Δt2 has elapsed from the timing when the detector 150 has detected that the mark 121c has reached the reference line H0, while rotating the reflector 120, the controller 140 inputs pulsed current to the light source 110 such that the light source 110 is turned on for a lighting period Td.

The predetermined time Δt2 is, for example, the time required for the rotation angle ψ of the reflector 120 to change from 0° to 90°. The controller 140 keeps the light source 110 on over the time Δt1 shorter than the rotation period Tr of the reflector 120 every lighting period Td (that is, Δt1<Tr).

In the present embodiment, the lighting period Td is longer than the rotation period Tr (that is, Td>Tr). Specifically, the lighting period Td is the such of the rotation period Tr and the time Δt1 (that is, Td=Tr+Δt1).

As described above, the center r12 of the light L11 emitted from the reflection surface 121a is located away from the rotation axis D on the pattern surface P. Accordingly, in the case in which the actuator 130 rotates the reflector 120 with the light source 110 kept on, the center r12 of the light L11 emitted from the reflection surface 121a moves on a circumference k1 of a circle centered on the rotation axis D on the pattern surface P as shown in FIG. 4 to FIG. 6.

Accordingly, in the first rotation, the light source 110 is kept on while the rotation angle ψ of the reflector 120 is in the range of 90° or more and less than (90+Δψ)°, and the light source 110 is kept off while the rotation angle s out of this range as shown in FIG. 4. The ht is therefore cast on a region J1 in the second quadrant P2 of the pattern surface P in the first rotation.

Subsequently, in the second rotation, the light source 110 is kept on while the rotation angle ψ of the reflector 120 is in the range of (90+Δψ)° or more and less than (90+2×Δψ)°, and the light source 110 is kept off while the rotation angle ψ is out of this range as shown in FIG. 5. The lights therefore cast on a region J2 adjacent to the region J1 in the rotational direction G in the second quadrant P2 of the pattern surface P in the second rotation. At this time, the light that was cast on the region J1 is visually recognized by a human as an afterimage.

Subsequently, in the nth rotation, the light source 110 is kept on while the rotation angle ψ of the reflector 120 is in the range of (90+(n−1)×Δψ)° or more and less than (90+n×Δψ)°, and the light source 110 is kept off while the rotation angle ψ is out of this range as shown in FIG. 6. In the nth rotation, the light is therefore cast on a region Jn adjacent in the rotational direction G to a region Jn−1 on which light was cast in the (n−1)th rotation in the second quadrant P2 of the pattern surface P. At this time, the regions J1 to Jn−1 on which light has been cast in the first to (n−1)th rotations are visually recognized by a human as afterimages. Accordingly, an c-shaped pattern K1 with a central angle of 90° is recognized by a human as being sequentially formed in the second quadrant P2.

After the single arc-shaped pattern K1 is formed by n rotations of the reflector 120, the controller 140 performs substantially the same control as in the first to nth rotations again to form a single arc-shaped pattern K1 again. The controller does not have to perform formation of the pattern again after forming the pattern once.

The pattern formed by the lighting device is not limited to the above pattern. For example, the central angle of the arc-shaped pattern formed by the lighting device can be 180°. The reflector can be rotated a plurality of times while light is cast on each region J1 (where i=1 to n).

Subsequently, examples of applications of the lighting device 100 are described.

Figure 7A:
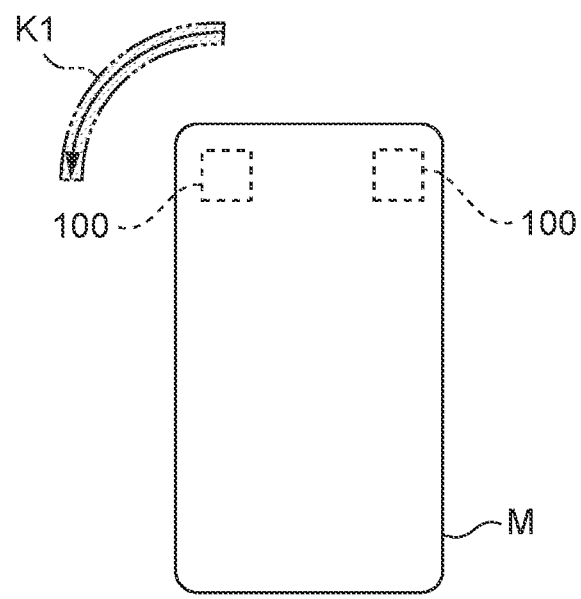
FIG. 7A is a schematic top view of a vehicle including the lighting devices at the front end.

FIG. 7A is a schematic top view of a vehicle including the lighting devices at the front end.

Figure 7B:
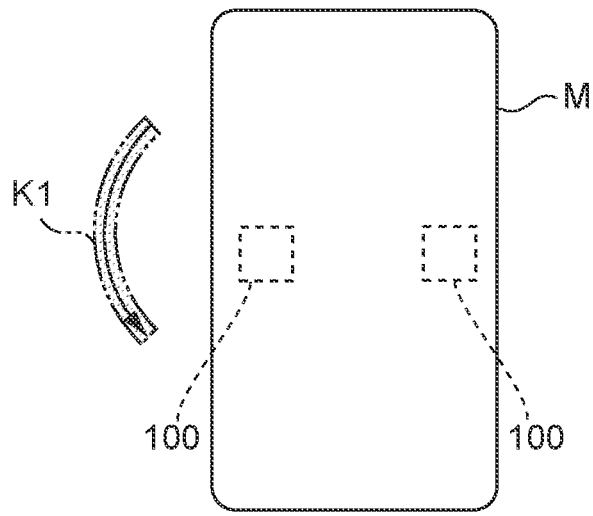
FIG. 7B is a schematic top view of a vehicle including the lighting devices on the lateral side.

FIG. 7B is a schematic top view of a vehicle including the lighting devices on the lateral side.

For example, the lighting device 100 is installed in a vehicle M as shown in FIG. 7A and FIG. 7B. In this case, the road surface corresponds to the pattern surface P.

For example, a single lighting device 100 is disposed on each of the right and left sides of the front end of the vehicle M as shown in FIG. 7A and operates in conjunction with a direction indicator so as to indicate that the vehicle M will turn right or left. Specifically, in the case of turning left, the lighting device 100 on the left side operates to form the arc-shaped pattern K1 counterclockwise as seen from the upward direction on the road surface, which is the pattern surface P. Likewise, in the case of turning right, the lighting device 100 on the right side operates to form an arc-shaped pattern clockwise as seen from the upward direction on the road surface.

For example, a single lighting device 100 is disposed on each of the right and left sides of the vehicle M as shown in FIG. 7B and operates in conjunction with opening and closing of doors. Specifically, for example, in the case in which a left door is opened or closed, the lighting device 100 on the left side operates to form the arc-shaped pattern K1 on the road surface. Likewise, in the case in which a right door is opened or closed, the lighting device 100 on the right side operates to form an arc-shaped pattern.

The lighting device can be disposed at the rear end of a vehicle. Applications of the lighting device are not limited to vehicles.

Subsequently, the effects of the present embodiment are described.

The lighting device 100 includes the light source 110, the reflector 120, the actuator 130, and the controller 140. The reflector 120 has the reflection surface 121a that is concave recessed toward the direction away from the light source 110 and configured to receive light emitted from the light source 110. The actuator 130 can rotate the reflector 120 with the axis passing through the light source 110 being the rotation axis D. The controller 140 keeps the light source 110 on over the time Δt1 shorter than the rotation period Tr of the reflector 120 according to the rotation angle ψ of the reflector 120 while controlling the actuator 130 to rotate the reflector 120. The casting direction of the light L11 emitted from the reflection surface 121a is inclined with respect to the extension direction of the rotation axis D. Accordingly, the casting direction of the light L11 emitted from the reflection surface 121a can be changed over time. This allows for obtaining the lighting device 100 that can form the pattern K1 on the pattern surface using a small number of parts.

The reflection surface 121a is a portion of the surface obtained by rotating the curved line E11 (being concave recessed toward the direction away from the light source 110) by using the axis F11 as the central axis. The axis F11 extends in a direction inclined with respect to the extension direction of the rotation axis D. The casting direction of light emitted from the reflection surface 121a can therefore be inclined with respect to the extension direction of the rotation axis D.

In a section including the rotation axis D, the reflection surface 121a is a portion of an ellipse having a major axis (axis F11) and a minor axis F12 extending in directions inclined with respect to the extension direction of the rotation axis D. The casting direction of the light L11 emitted from the reflection surface 121a can therefore be inclined with respect to the extension direction of the rotation axis D. If the foci of the ellipse are located on the light source 110 and the pattern surface P, the reflection surface 121a can condense light emitted from the light source 110 on the pattern surface P.

The controller 140 keeps the light source 110 on over the time Δt1 shorter than the rotation period Tr of the reflector 120 every rotation of the reflector 120 while controlling the actuator 130 to allow the reflector 120 to experience a plurality of rotations, so that the controller 140 gradually changes the rotation angle ψ of the reflector 120 at the timing when the light source 110 is turned on. Accordingly, the arc-shaped pattern K1 can be sequentially formed by illuminating only the region Ji (where i=1 to n), which is a portion of the pattern surface P, of the arc-shaped pattern K1 at a certain timing and changing the region Ji to be illuminated over time.

A method of casting light according to the present embodiment includes keeping the light source 110 on over the time Δt1 shorter than the rotation period Tr of the reflector 120 according to the rotation angle ψ of the reflector 120 while rotating the reflector 120 (having the reflection surface 121a concave recessed toward the direction away from the light source 110 and configured to receive light emitted from the light source 110) with the axis passing through the light source 110 being the rotation axis D. In the above step, the casting direction of the light L11 emitted from the reflection surface 121a is inclined with respect to the extension direction of the rotation axis D. Accordingly, the casting direction of the light L11 emitted from the reflection surface 121a can be changed over time. This allows for obtaining the method of casting light in which the pattern K1 can be formed on the pattern surface using a small number of parts.

The example in which the mark is detected by the detector has been described in the present embodiment, but the rotation angle of the reflector can be measured with a rotary encoder without the detector and the mark.

Second Embodiment

Subsequently, a second embodiment is described.

Figure 8:
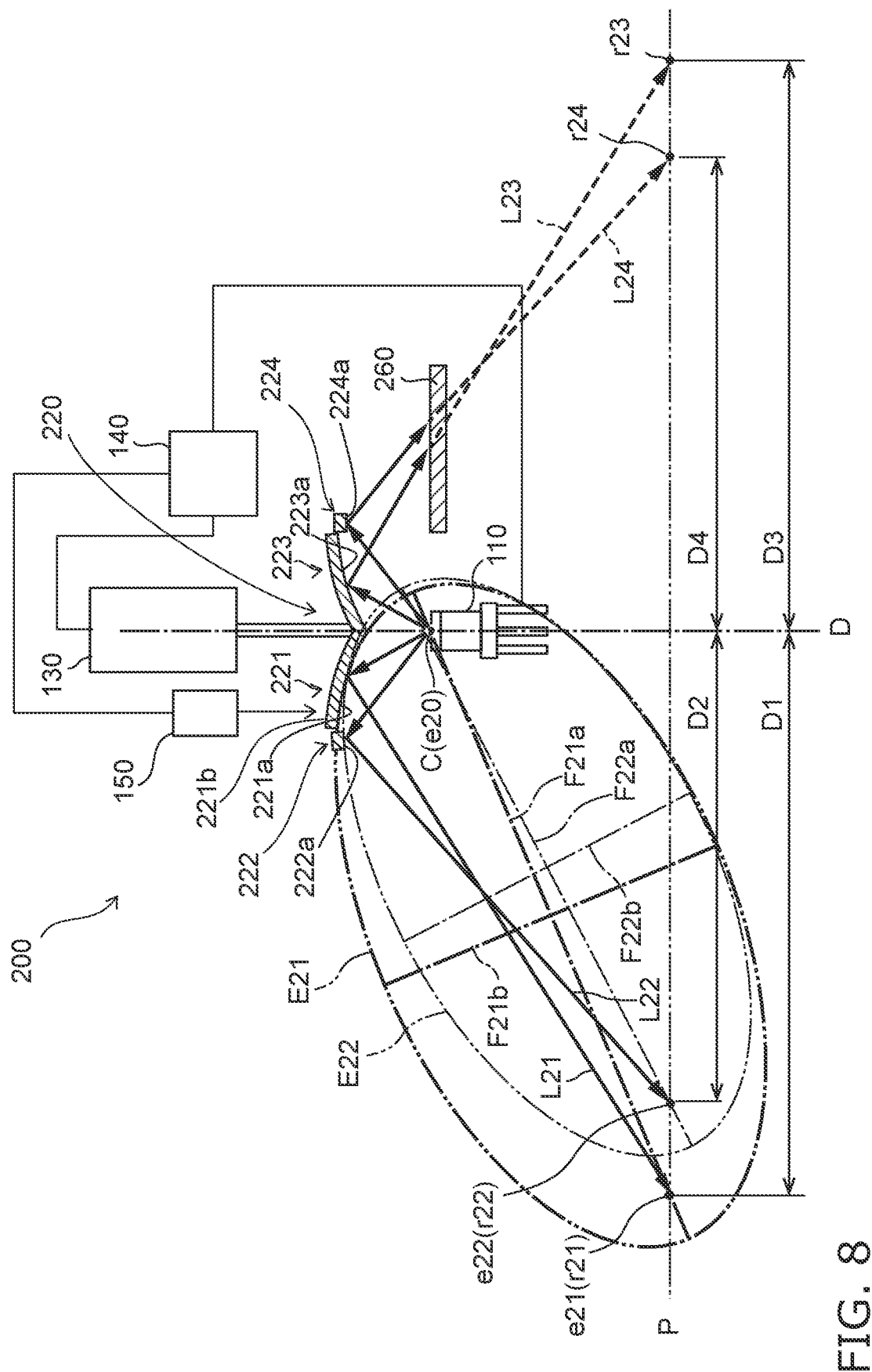
FIG. 8 is a schematic partial cross-sectional view of an lighting device according to a second embodiment.

FIG. 8 is a schematic partial cross-sectional view of an lighting device according to the present embodiment.

Figure 9:
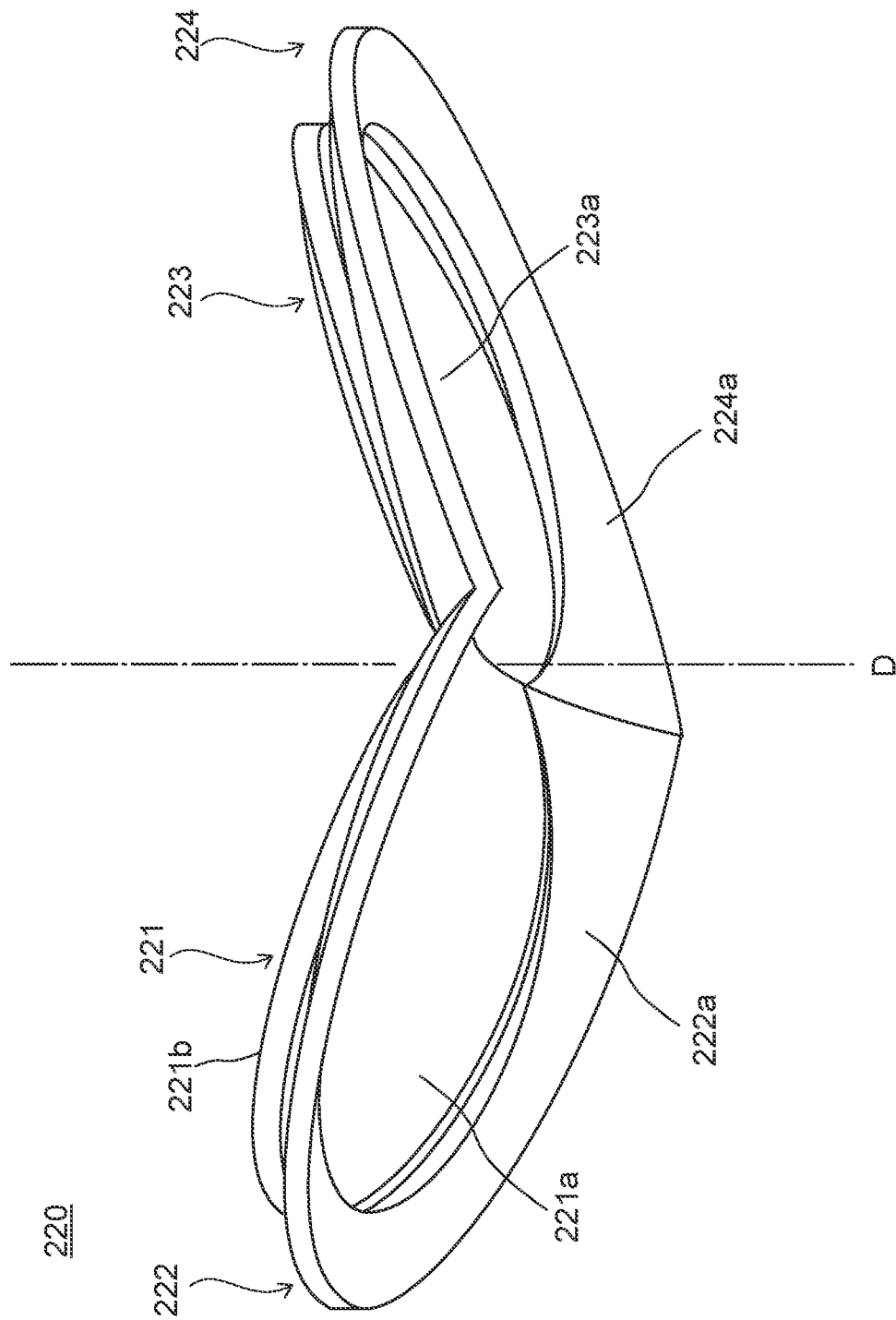
FIG. 9 is a schematic perspective view of a reflector in the lighting device.

FIG. 9 is a schematic perspective view of a reflector in the lighting device.

Figure 10:
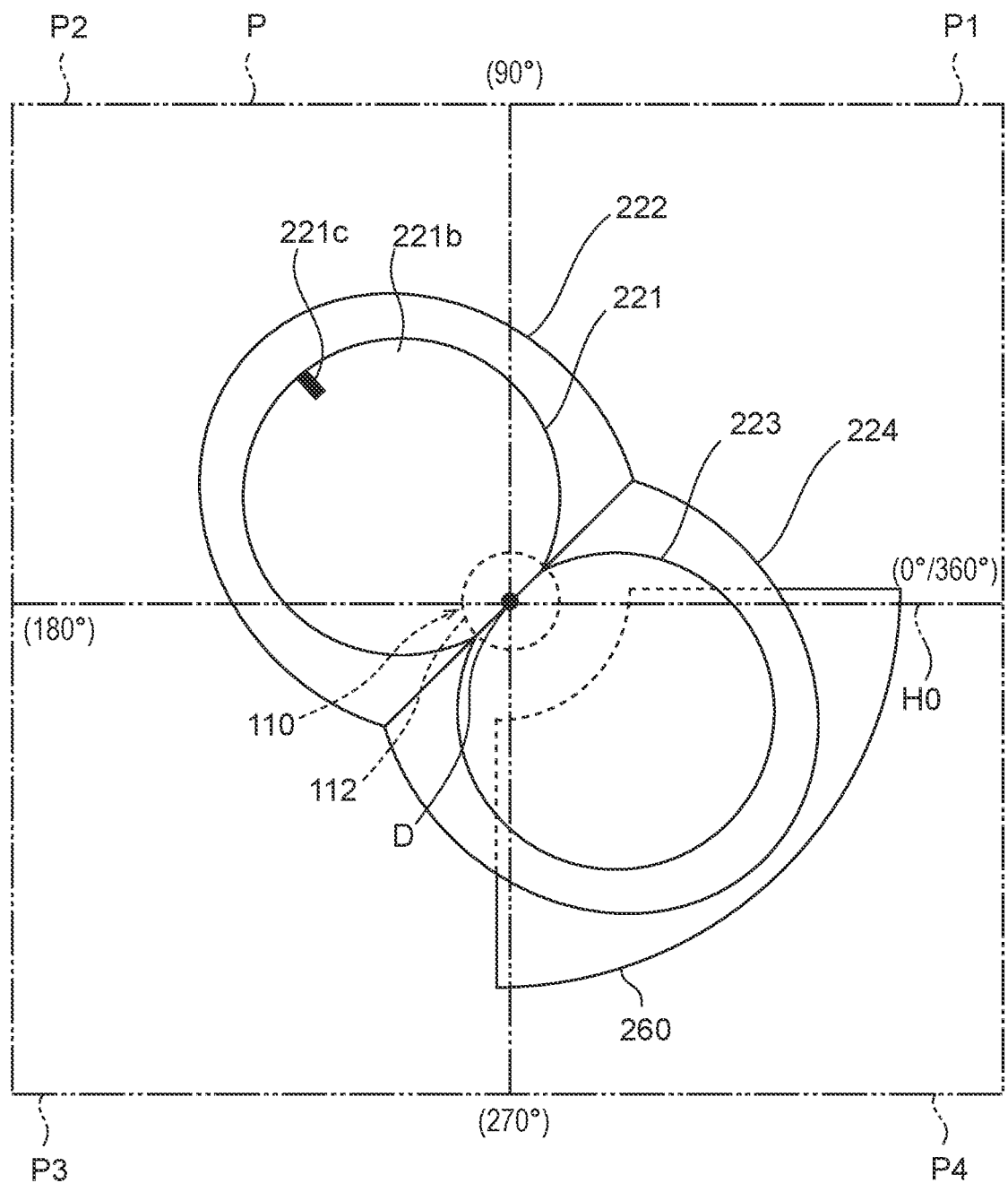
FIG. 10 is a schematic top view of the light source, the reflector, and a light-shielding member.

FIG. 10 is a schematic top view of the light source, the reflector, and a light-shielding member.

An lighting device 200 according to the present embodiment differs from the lighting device 100 according to the first embodiment in the structure of a reflector 220 and in that a light-shielding member 260 is further included.

Only differences from the first embodiment are generally described below. Matters other than the matters described below are substantially the same as in the first embodiment. The same applies to other embodiments described below.

The reflector 220 includes a first reflective portion 221, a second reflective portion 222, a third reflective portion 223, and a fourth reflective portion 224 as shown in FIG. 8 and FIG. 9.

The first reflective portion 221 is curved to form a concave shape recessed toward the direction away from the light source 110. The first reflective portion 221 has almost circular shape in a top view as shown in FIG. 10. The surfaces of the first reflective portion 221 include a first reflection surface 221a that receives light emitted from the light source 110 and an upper surface 221b opposite to the first reflection surface 221a as shown in FIG. 8 and FIG. 9. A mark 221c is provided on the upper surface 221b as shown in FIG. 10.

The first reflection surface 221a is a portion of a surface obtained by rotating a first ellipse E21 having a major axis F21a and a minor axis F21b extending in directions inclined with respect to the extension direction of the rotation axis D with the major axis F21a being the central axis as shown in FIG. 8.

The first reflection surface 221a is set such that light L21 emitted from the first reflection surface 221a is condensed on the pattern surface P. Specifically, the first reflection surface 221a is disposed along the first ellipse E21 having one focus e20 on the light source 110 and the other focus e21 on the pattern surface P. The light L21 emitted from the first reflection surface 221a is therefore condensed on the focus e21. Accordingly, a center r21 of the light L21 emitted from the first reflection surface 221a on the pattern surface P is located on the focus e21. The focus e20 is located on the rotation axis D, and the focus e21 is located away from the rotation axis D. The casting direction of the light L21 emitted from the first reflection surface 221a is inclined with respect to the extension direction of the rotation axis D.

The second reflective portion 222 is disposed around the first reflective portion 221 as shown in FIG. 8 and FIG. 9. The second reflective portion 222 is curved to form a concave shape recessed toward the direction away from the light source 110. The surface of the second reflective portion 222 includes a second reflection surface 222a that receives light emitted from the light source 110.

The second reflection surface 222a is a portion of a surface obtained by rotating a second ellipse E22 having a major axis F22a and a minor axis F22b extending in directions inclined with respect to the rotation axis D with the major axis F22a being the central axis.

The second reflection surface 222a is set such that light L22 emitted from the second reflection surface 222a is condensed on the pattern surface P. Specifically, for example, the second reflection surface 222a is disposed along the second ellipse E22 having one focus on the focus e20 of the first ellipse E21 and the other focus e22 on the pattern surface P. The light L22 emitted from the second reflection surface 222a is therefore condensed on the focus e22. Accordingly, a center r22 of the light L22 emitted from the second reflection surface 222a on the pattern surface P is located on the focus e22. The focus e22 is located away from the rotation axis D. The casting direction of the light L22 emitted from the second reflection surface 222a is inclined with respect to the extension direction of the rotation axis D.

The major axis F22a of the second reflection surface 222a is inclined with respect to the major axis F21a of the first reflection surface 221a. Accordingly, the position of the focus e22 differs from the position of the focus e21 of the first ellipse E21. Therefore, on the pattern surface P, a first distance D1 between the center r21 of the light L21 emitted from the first reflection surface 221a and the rotation axis D differs from a second distance D2 between the center r22 of the light L22 emitted from the second reflection surface 222a and the rotation axis D (that is, D1≠D2). In the example shown in FIG. 8, the second distance D2 is shorter than the first distance D1 (that is, D2<D1). The second distance can be longer than the first distance.

The first reflective portion 221 and the third reflective portion 223 are arranged at a regular interval in the circumferential direction centered on the rotation axis D as shown in FIG. 10. It is sufficient that the position of the third reflective portion differs from the position of the first reflective portion in the circumferential direction centered on the rotation axis.

The third reflective portion 223 and the first reflective portion 221 are symmetric with respect to a plane passing through the rotation axis D as shown in FIG. 8. Accordingly, the casting direction of light L23 emitted from a third reflection surface 223a of the third reflective portion 223 is inclined with respect to the extension direction of the rotation axis D. On the pattern surface P, a third distance D3 between a center r23 of the light L23 emitted from the third reflection surface 223a and the rotation axis D is equal to the first distance D1 (that is, D3=D1). The third reflective portion and the first reflective portion does not have to be symmetric as long as the third distance is equal to the first distance.

The fourth reflective portion 224 and the second reflective portion 222 are symmetric with respect to a plane passing through the rotation axis D. Accordingly, the casting direction of light L24 emitted from a fourth reflection surface 224a of the fourth reflective portion 224 is inclined with respect to the extension direction of the rotation axis D. On the pattern surface P, a fourth distance D4 between a center r24 of the light L24 emitted from the fourth reflection surface 224a and the rotation axis D is equal to the second distance D2 (that is, D4=D2). The fourth reflective portion and the second reflective portion does not have to be symmetric as long as the fourth distance is equal to the second distance.

The light-shielding member 260 is disposed over a quadrant on which light is not to be cast in the pattern surface P in a top view. In the present embodiment, the light-shielding member 260 is mainly disposed over the fourth quadrant P4 in a top view as shown in FIG. 10. The light-shielding member 260 can have the shape of a plate. For example, the surface of the light-shielding member 260 is black and absorbs light.

The light-shielding member 260 blocks light traveling from each of the reflection surfaces 221a, 222a, 223a, and 224a to the fourth quadrant P4 of the pattern surface P as shown in FIG. 8. Specifically, light emitted from the light source 110 is incident on each of the reflection surfaces 221a, 222a, 223a, and 224a. In the case in which the first reflection surface 221a and the second reflection surface 222a are mainly located in the second quadrant P2 in a top view and in which the third reflection surface 223a and the fourth reflection surface 224a are mainly located in the fourth quadrant P4 in a top view, light emitted from the first reflection surface 221a and the second reflection surface 222a is cast on the second quadrant P2, while light emitted from the third reflection surface 223a and the fourth reflection surface 224a is blocked by the light-shielding member 260. Likewise, in the case in which the third reflection surface 223a and the fourth reflection surface 224a are mainly located in the second quadrant P2 in a top view and in which the first reflection surface 221a and the second reflection surface 222a are mainly located in the fourth quadrant P4 in a top view, light emitted from the third reflection surface 223a and the fourth reflection surface 224a is cast on the second quadrant P2, while light emitted from the first reflection surface 221a and the second reflection surface 222a is blocked by the light-shielding member 260.

Figure 11:
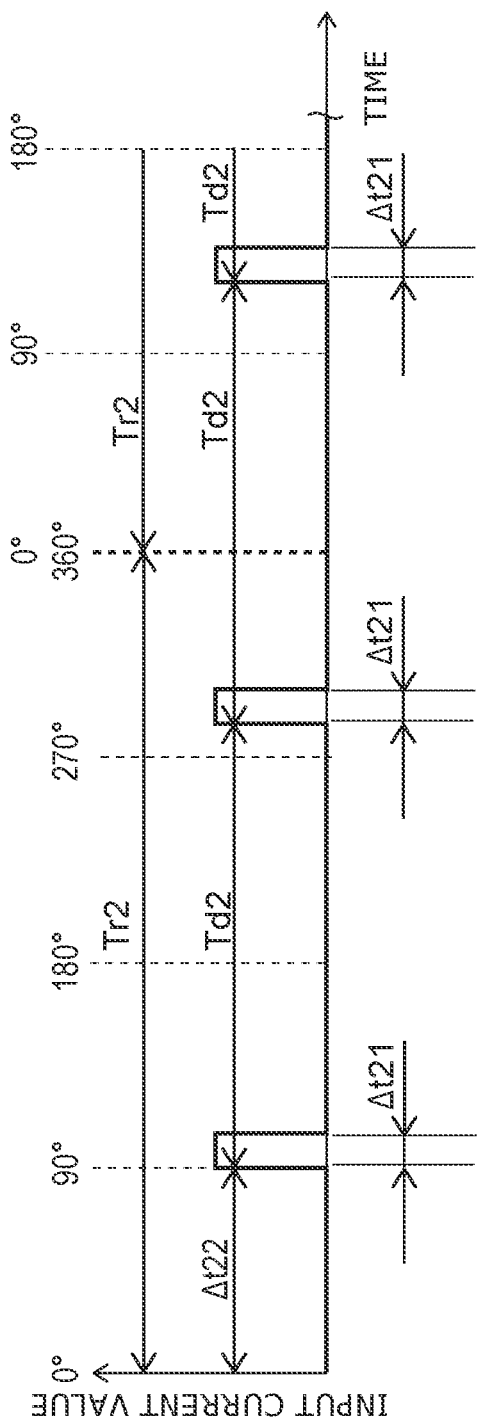
FIG. 11 is a graph showing input signals applied to the light source, with tune on the horizontal axis and input current value on the vertical axis.

Subsequently, operation of the lighting device 200 according to the present embodiment is described, FIG. 11 is a graph showing input signals applied to the light source, with time on the horizontal axis and input current value on the vertical axis.

Figure 12:
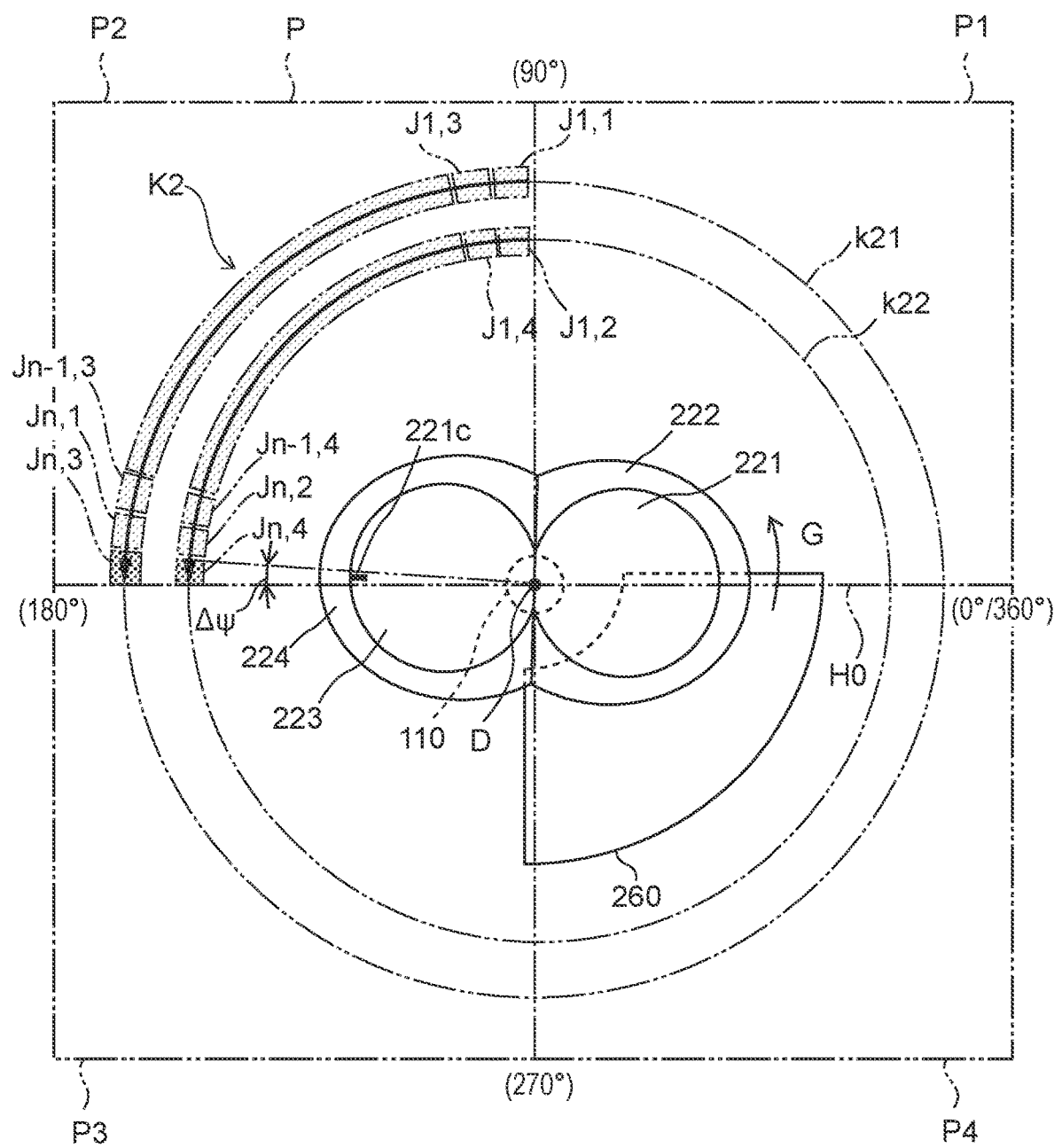
FIG. 12 is a schematic top view of light emitted from the lighting device.

FIG. 12 is a schematic top view of light emitted from the lighting device.

The controller 140 controls the actuator 130 to rotate the reflector 220 at a rotation period Tr2.

Subsequently, after a predetermined time Δt22 has elapsed from the timing when the detector 150 has detected that the mark 221c has reached the reference line H0, while rotating the reflector 220, the controller 140 inputs pulsed current to the light source 110 such that the light source 110 is turned on for a lighting period Td2.

The predetermined time Δt22 is, for example, the time required for the rotation angle ψ of the reflector 220 to change from 0° to 90°. The controller 140 keeps the light source 110 on over the time Δt21 shorter than the rotation period Tr2 of the reflector 220 every lighting period Td2 (that is, Δt21<Tr2).

The lighting period Td2 is shorter than the rotation period Tr2 (that is, Td2<Tr2). Specifically, the lighting period Td2 is the sum of half the rotation period Tr2 and the time Δt21 (that is, Td2=Tr2/2+Δt21).

In the case in which the actuator 130 rotates the reflector 220 with the light source 110 is on, the light L21 and L23 emitted from the first reflection surface 221a and the third reflection surface 223a move on a first circumference k21 that is centered on the rotation axis D on the pattern surface P as shot in FIG. 12, and light L22 and L24 emitted from the second reflection surface 222a and the fourth reflection surface 224a move on a second circumference k22 that is centered on the rotation axis D on the pattern surface P. The second circumference k22 has a radius smaller than the radius of the first circumference k21.

Accordingly, the light source 110 is turned on twice and is turned off other than those timings in the first rotation. In the first lighting in the first rotation, the light source 110 is kept on while the rotation angle ψ of the reflector 220 is in the range of 90° or more and less than (90+Δψ)°. At this time, light emitted from the light source 110 is incident on each of the reflection surfaces 221a, 222a, 223a, and 224a. The light L21 emitted from the first reflection surface 221a is cast on a region J1,1 in the second quadrant P2. The light L22 emitted from the second reflection surface 222a is cast on a region J1,2 located inward of the region J1,1 in a direction toward the rotation axis D in the second quadrant P2. The light L23 and L24 emitted from the third reflection surface 223a and the fourth reflection surface 224a are blocked by the light-shielding member 260.

In the second lighting in the first rotation, the light source 110 is kept on while the rotation angle of the reflector 220 is in the range of (270°+Δψ)° or more and less than (270+2×Δψ)°. At this time, light emitted from the light source 110 is incident on each of the reflection surfaces 221a, 222a, 223a, and 224a. The light L23 emitted from the third reflection surface 223a is cast on a region J1,3 adjacent to the region J1,1 in the rotational direction G in the second quadrant P2. The light L24 emitted from the fourth reflection surface 224a is cast on a region J1,4 adjacent to the region J1,2 in the rotational direction G in the second quadrant P2. The light L21 and L22 emitted from the first reflection surface 221a and the second reflection surface 222a are blocked by the light-shielding member 260.

Likewise, the light source 110 is turned on twice and is turned off other bran those timings in the nth rotation. In the first lighting in the nth rotation, the light source 110 is kept on while the rotation angle ψ of the reflector 220 is in the range of (90+2×n×Δψ)° or more and less than (90+2×(n+1)×Δψ)°. At this time, light emitted from the light source 110 is incident on each of the reflection surfaces 221a, 222a, 223a, and 224a. The light L21 emitted from the first reflection surface 221a is cast on a region Jn,1 which is in the second quadrant P2, adjacent in the rotational direction G to a region Jn−1,3 irradiated with the light L23 emitted from the third reflection surface 223a at the time of the second lighting of the light source 110 in the (n−1)th rotation. The light L22 emitted from the second reflection surface 222a is cast on a region Jn,2, which is in the second quadrant P2, adjacent in the rotational direction G to a region Jn−1,4 irradiated with the light L24 emitted from the fourth reflection surface 224a at the time of the second lighting of the light source 110 in the (n−1)th rotation. The light L23 and L24 emitted from the third reflection surface 223a and the fourth reflection surface 224a are blocked by the light-shielding member 260.

In the second lighting in the nth rotation, the light source 110 is kept on while the rotation angle ψ of the reflector 220 is in the range of (270°+2×(n+1)×Δψ)° or more and less than (270°+2×(n+2)×Δψ)°. At this time, light emitted from the light source 110 is incident on ch of the reflection surfaces 221a, 222a, 223a, and 224a. The light L23 emitted from the third reflection surface 223a is cast on a region Jn,3 adjacent to the region Jn,1 in the rotational direction G in the second quadrant P2. The light L24 emitted from the fourth reflection surface 224a is cast on a region Jn,4 adjacent to the region Jn,2 in the rotational direction G in the second quadrant P2. The light L21 and L22 emitted from the first reflection surface 221a and the second reflection surface 222a are blocked by the light-shielding member 260.

At this time, the light cast on the pattern surface P in the first to (n−1)th rotations is visually recognized as afterimages by a human. Accordingly, a double-arc-shaped pattern K2 is sequentially formed in the second quadrant P2.

As described above, light can be cast on two regions on the first circumference k21 on the pattern surface P by turning on the light source 110 twice in each rotation of the reflector 220 and using the first reflection surface 221a and the third reflection surface 223a. Likewise, light can be cast on two regions on the second circumference k22 on the pattern surface P by turning on the light source 110 twice in each rotation of the reflector 220 and using the second reflection surface 222a and the fourth reflection surface 224a. Accordingly, the lowest speed of rotation of the reflector 220 at which afterimages can be obtained can be slower than the lowest speed of rotation of the reflector 120 at which afterimages can be obtained in the first embodiment.

After the double-arc-shaped pattern K2 is formed by n rotations of the reflector 220, the controller 140 performs substantially the same control as in the first to nth rotations again to form the double-arc-shaped pattern K2 again.

Subsequently, the effects of the present embodiment are described.

The reflector 220 further has the second reflection surface 222a that is disposed around the first reflection surface 221a, concave recessed toward the direction away from the light source 110, and configured to receive light emitted from the light source 110. The casting direction of light emitted from the second reflection surface 222a is inclined with respect to the extension direction of the rotation axis D. On a plane (pattern surface P) orthogonal to the rotation axis D, the first distance D1 between the center r21 of the light L21 emitted from the first reflection surface 221a and the rotation axis D differs from the second distance D2 between the center r22 of the light L22 emitted from the second reflection surface 222a and the rotation axis D (that is, D2≠D1). Accordingly, the double-arc-shaped pattern K2 can be formed.

The reflector 220 further has the third reflection surface 223a that is located at a position different from the position of the first reflection surface 221a in the circumferential direction centered on the rotation axis D, concave recessed toward the direction away from the light source 110, and configured to receive light emitted from the light source 110. The casting direction of the light L23 emitted from the third reflection surface 223a is inclined with respect to the extension direction of the rotation axis D. On a plane (pattern surface P) orthogonal to the rotation axis D, the third distance D3 between the center r23 of the light L23 emitted from the third reflection surface 223a and the rotation axis D is equal to the first distance D1 between the center r21 of the light L21 emitted from the first reflection surface 221a and the rotation axis D (that is, D3=D1). Accordingly, the lowest speed of rotation of the reflector 220 at which afterimages can be obtained can be slower than the lowest speed of rotation of the reflector 120 at which afterimages can be obtained in the first embodiment.

The reflector 220 further has the third reflection surface 223a and the fourth reflection surface 224a. The third reflection surface 223a is located at a position different from the position of the first reflection surface 221a in the circumferential direction centered on the rotation axis D, concave recessed toward the direction away from the light source 110, and configured to receive light emitted from the light source 110. The fourth reflection surface 224a is disposed around the third reflection surface 223a, concave recessed toward the direction away from the light source 110, and configured to receive light emitted from the light source 110. The casting direction of the light L23 emitted from the third reflection surface 223a and the casting direction of the light L24 emitted from the fourth reflection surface 224a are inclined with respect to the extension direction of the rotation axis D. On a plane (pattern surface P), the third distance D3 between the center r23 of the light L23 emitted from the third reflection surface 223a and the rotation axis D is equal to the first distance D1 (that is, D3=D1), and the fourth distance D4 between the center r24 of the light L24 emitted from the fourth reflection surface 224a and the rotation axis D is equal to the second distance D2 (that is, D4=D2). Accordingly, the double-arc-shaped pattern K2 can be formed at a low speed of rotation of the reflector 220.

The first reflection surface 221a and the third reflection surface 223a are arranged at a regular interval in the circumferential direction. This structure can keep the reflector 20 in balance when being rotated.

The example in which the reflector 220 has the two reflection surfaces 221a and 223a that cast light on the same circumference on the pattern surface has been described in the present embodiment, but the reflector can have three or more reflection surfaces that cast light on the same circumference on a plane.

Third Embodiment

Subsequently, a third embodiment is described.

Figure 13:
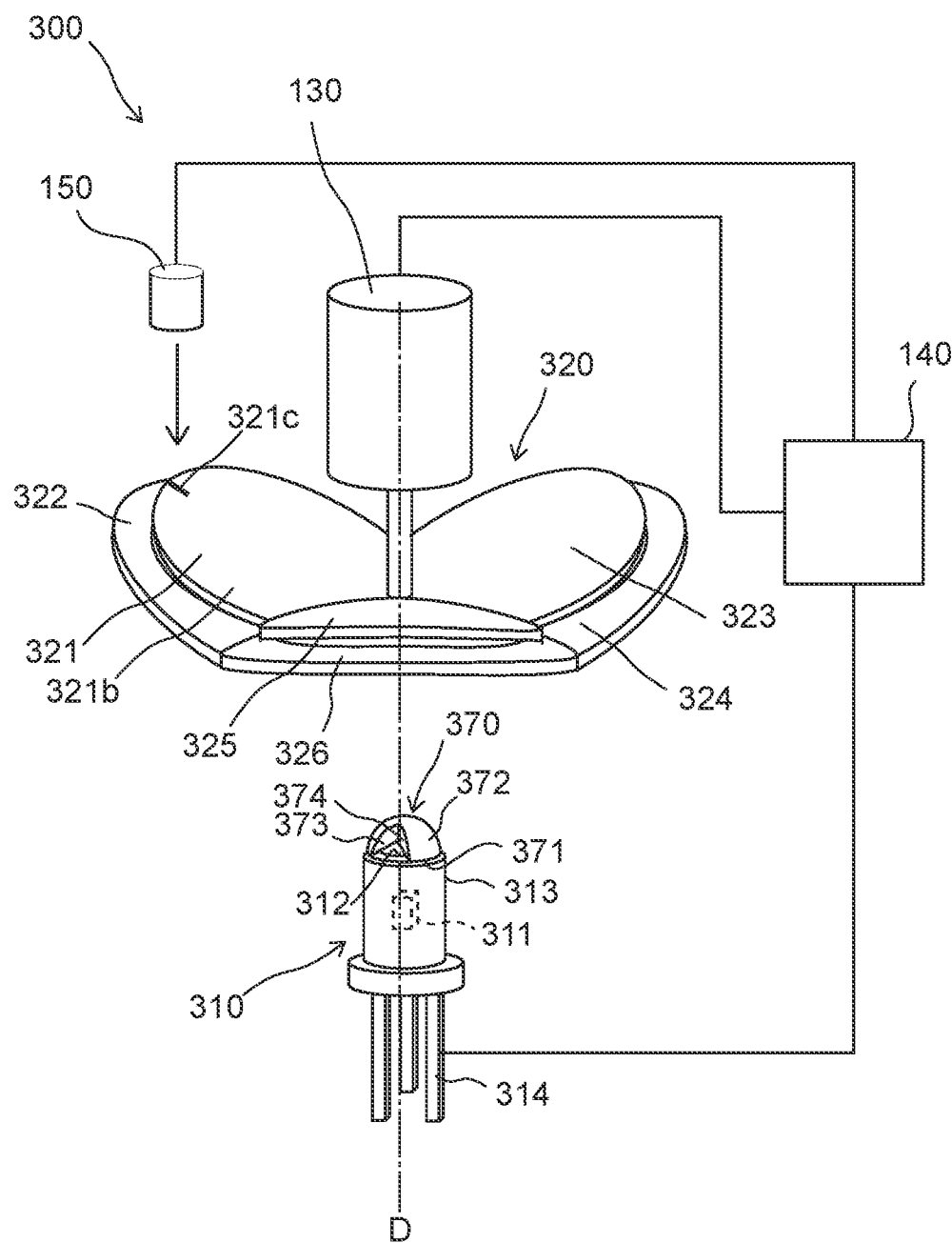
FIG. 13 is a schematic perspective view of a lighting device according to a third embodiment.

FIG. 13 is a schematic perspective view of an lighting device according to the present embodiment.

An lighting device 300 according to the present embodiment differs from the lighting device 100 according to the first embodiment in the structures of a light source 310 and a reflector 320 and in that a reflective member 370 is further included.

The light source 310 includes a casing 313, a light-emitting element 311 housed in the casing 313, a wavelength conversion member 312 disposed on the upper surface of the casing 313, and terminals 314 disposed on the lower surface of the casing 313.

Figure 14:
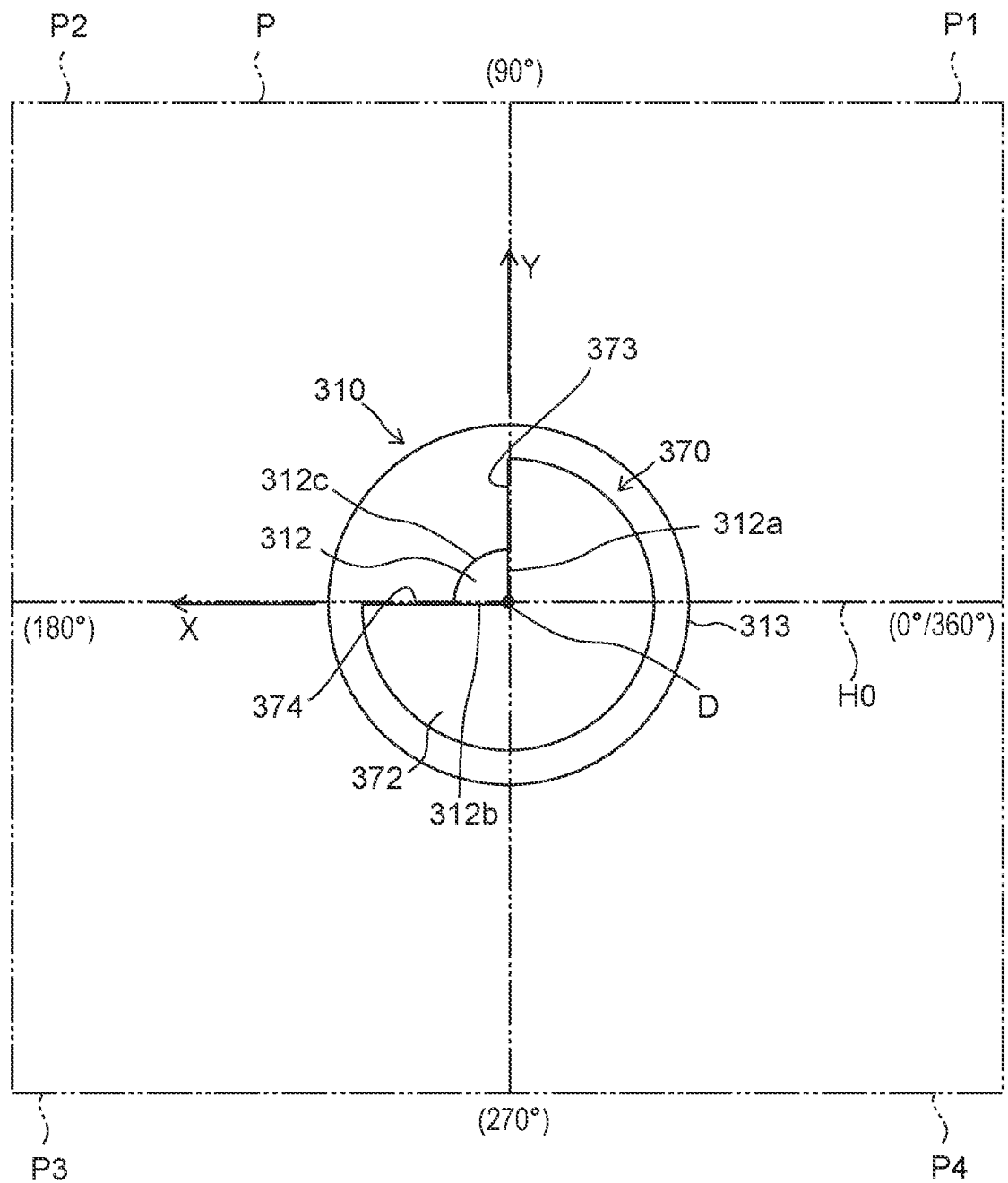
FIG. 14 is a schematic top view of a light source and a reflective member in the lighting device.

FIG. 14 is a schematic top view of the light source and the reflective member in the lighting device.

The wavelength conversion member 312 has a fan shape with a central angle of 90° in a top view in the present embodiment. The shape of the wavelength conversion member is not limited to the above shape and can be a polygonal shape such as a triangular shape and a quadrangular shape in a top view. The wavelength conversion member 312 is disposed in the second quadrant P2 in a top view.

Lateral surfaces of the wavelength conversion member 312 have a first region 312a, a second region 312b, and a third region 312c. The first region 312a is a flat surface parallel to the extension direction of the rotation axis D and a first direction Y orthogonal to the extension direction of the rotation axis D. That is, the first region 312a is a flat surface including the extension direction of the rotation axis D and the first direction Y. The first direction Y is, for example, orthogonal to the reference line H0. The second region 312b is a flat surface parallel to the extension direction of the rotation axis D and a second direction X intersecting the first direction Y. That is, the second region 312b is a flat surface including the extension direction of the rotation axis D and the second direction X. The second direction X is, for example, parallel to the reference line H0. The third region 312c is located between the first region 312a and the second region 312b and curved to form a convex shape in a direction away from the rotation axis D.

As shown in FIG. 13, the reflective member 370 is disposed between the light source 310 and the reflector 320. The reflective member 370 reflects light emitted from the light source 310. The reflective member 370 can be formed of metal. The reflective member 370 can be formed of a material such as resin and glass, and a reflective coating can be applied to a first mirror surface 373 and a second mirror surface 374. The reflective coating is formed of, for example, a metal such as aluminum or a dielectric film. In the present embodiment, the reflective member 370 has a notched hemispherical shape having a fan shape with a central angle of 270° in a top view. The reflective member 370 is located in the first quadrant P1, the third quadrant P3, and the fourth quadrant P4 in a top view as shown in FIG. 14.

Surfaces of the reflective member 370 include a lower surface 371 facing the upper surface of the casing 313, an upper surface 372 opposite to the lower surface 371, and the first mirror surface 373 and the second mirror surface 374 between the lower surface 371 and the upper surface 372 as shown in FIG. 13.

The lower surface 371 is fixed to the upper surface of the casing 313. The upper surface 372 is curved to form a concave shape recessed toward the direction away from the upper surface of the casing 313. The lower surface 371 and the upper surface 372 have a fan shape with a central angle of 270° in a top view as shown in FIG. 14.

The first mirror surface 373 is a flat surface parallel to the extension direction of the rotation axis D and the first direction Y. That is, the first mirror surface 373 is a flat surface including the extension direction of the rotation axis D and the first direction Y. Light emitted from the light source 310 is incident on the first mirror surface 373. The first mirror surface 373 is in contact with the first region 312a of the lateral surface of the wavelength conversion member 312.

The second mirror surface 374 is in contact with the first mirror surface 373. The second mirror surface 374 is a flat surface parallel to the extension direction of the rotation axis D and the second direction X. That is, the second mirror surface 374 is a flat surface including the extension direction of the rotation axis D and the second direction X. The second mirror surface 374 is in contact with the second region 312b of the lateral surface of the wavelength conversion member 312. Light emitted from the light source 310 is incident on the second mirror surface 374.

The first mirror surface 373 and the second mirror surface 374 distribute light emitted from the light source 310 mainly to the second quadrant P2 in a top view, and distribution of light to the first quadrant P1, the third quadrant P3, and the fourth quadrant P4 is reduced. Distribution of light from the light source 310 can be controlled using the reflective member 370 in this way.

The reflector 320 includes a first reflective portion 321, a second reflective portion 322, a third reflective portion 323, a fourth reflective portion 324, a fifth reflective portion 325, and a sixth reflective portion 326 as shown in FIG. 13. The reflective portions 321, 322, 323, 324, 325, and 326 are each curved to form a concave shape recessed toward the direction away from the light source 310. The first reflective portion 321, the third reflective portion 323, and the fifth reflective portion 325 are arranged at a regular interval in the circumferential direction centered on the rotation axis D.

Figure 15:
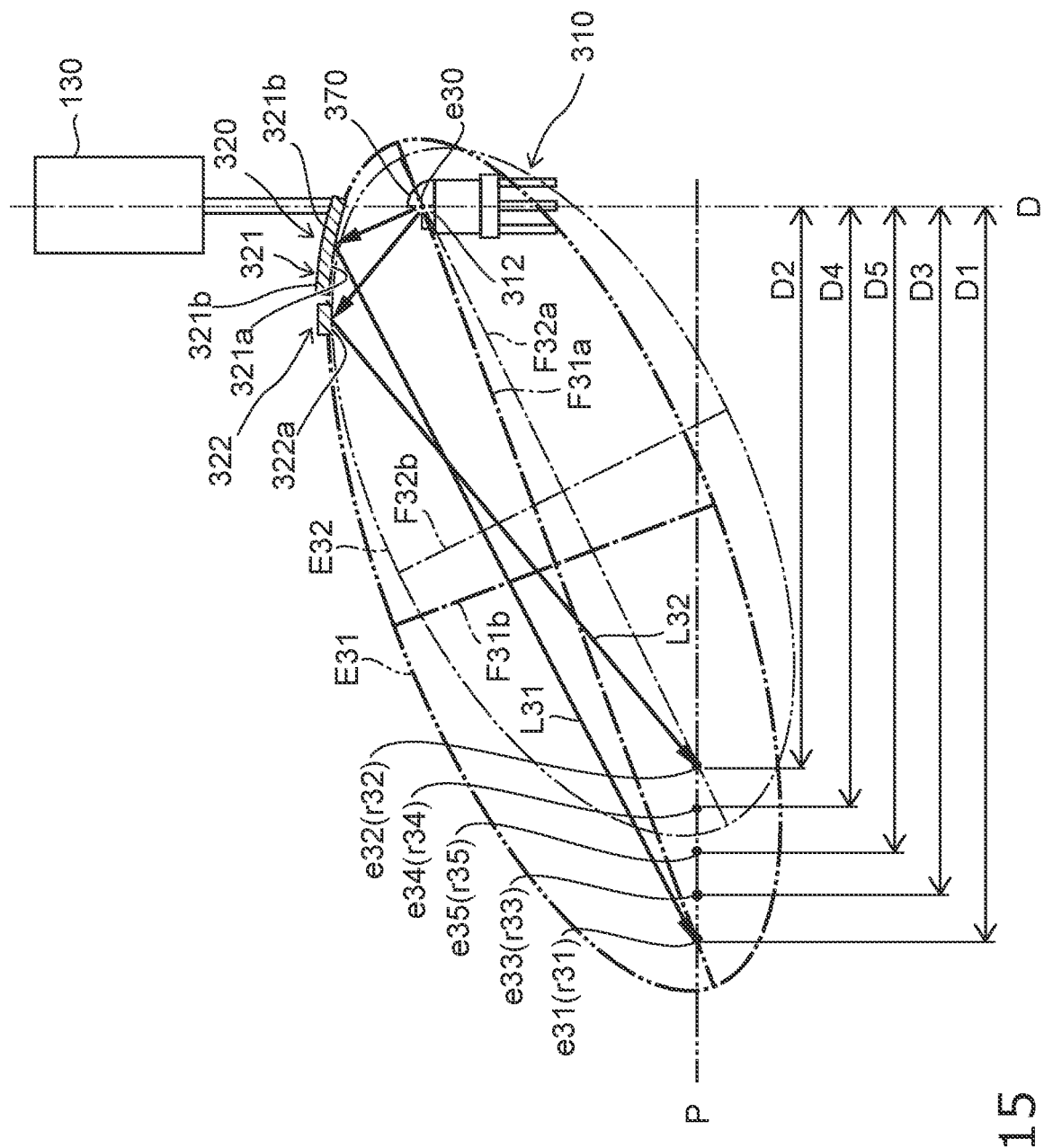
FIG. 15 is a schematic partial cross-sectional view of the lighting device.

FIG. 15 is a schematic partial cross-sectional view of the lighting device.

In FIG. 15, the third reflective portion 323, the fourth reflective portion 324, the fifth reflective portion 325, and the sixth reflective portion 326 of the reflector 320 are omitted.

The surfaces of the first reflective portion 321 include a first reflection surface 321a that receives light emitted from the light source 310 and an upper surface 321b opposite to the first reflection surface 321a as shown in FIG. 15. A mark 321c is provided on the upper surface 321b as shown in FIG. 13.

The first reflection surface 321a is a portion of a surface obtained by rotating a first ellipse E31 having a major axis F31a and a minor axis F31b extending in directions inclined with respect to the extension direction of the rotation axis D with the major axis F31a being the central axis.

The first reflection surface 321a is set such that light L31 emitted from the first reflection surface 321a is condensed on the pattern surface P. Specifically, the first reflection surface 321a is disposed along the first ellipse E31 having one focus e30 on the light source 310 and the other focus e31 on the pattern surface P. The light L31 emitted from the first reflection surface 321a is therefore condensed on the focus e31. Accordingly, a center r31 of the light L31 emitted from the first reflection surface 321a on the pattern surface P is located on the focus e31. The focus e30 is located on the rotation axis D, and the focus e31 is located away from the rotation axis D. The casting direction of the light L31 emitted from the first reflection surface 321a is inclined with respect to the extension direction of the rotation axis D.

The second reflective portion 322 is disposed around the first reflective portion 321. The surface of the second reflective portion 322 includes a second reflection surface 322a that receives light emitted from the light source 310. The second reflection surface 322a is a portion of a surface obtained by rotating a second ellipse E32 having a major axis F32a and a minor axis F32b extending in directions inclined with respect to the extension direction of the rotation axis D with the major axis F32a being the central axis.

The second reflection surface 322a is set such that light L32 emitted from the second reflection surface 322a is condensed on the pattern surface P. Specifically, for example, the second reflection surface 322a is disposed along the second ellipse E32 having one focus on the focus e30 of the first ellipse E31 and the other focus e32 on the pattern surface P. The light L32 emitted from the second reflection surface 322a is therefore condensed on the focus e32. Accordingly, a center r32 of the light L32 emitted from the second reflection surface 322a on the pattern surface P is located on the focus e32. The focus e32 is located away from the rotation axis D. The casting direction of the light L32 emitted from the second reflection surface 322a is inclined with respect to the extension direction of the rotation axis D.

Figure 16:
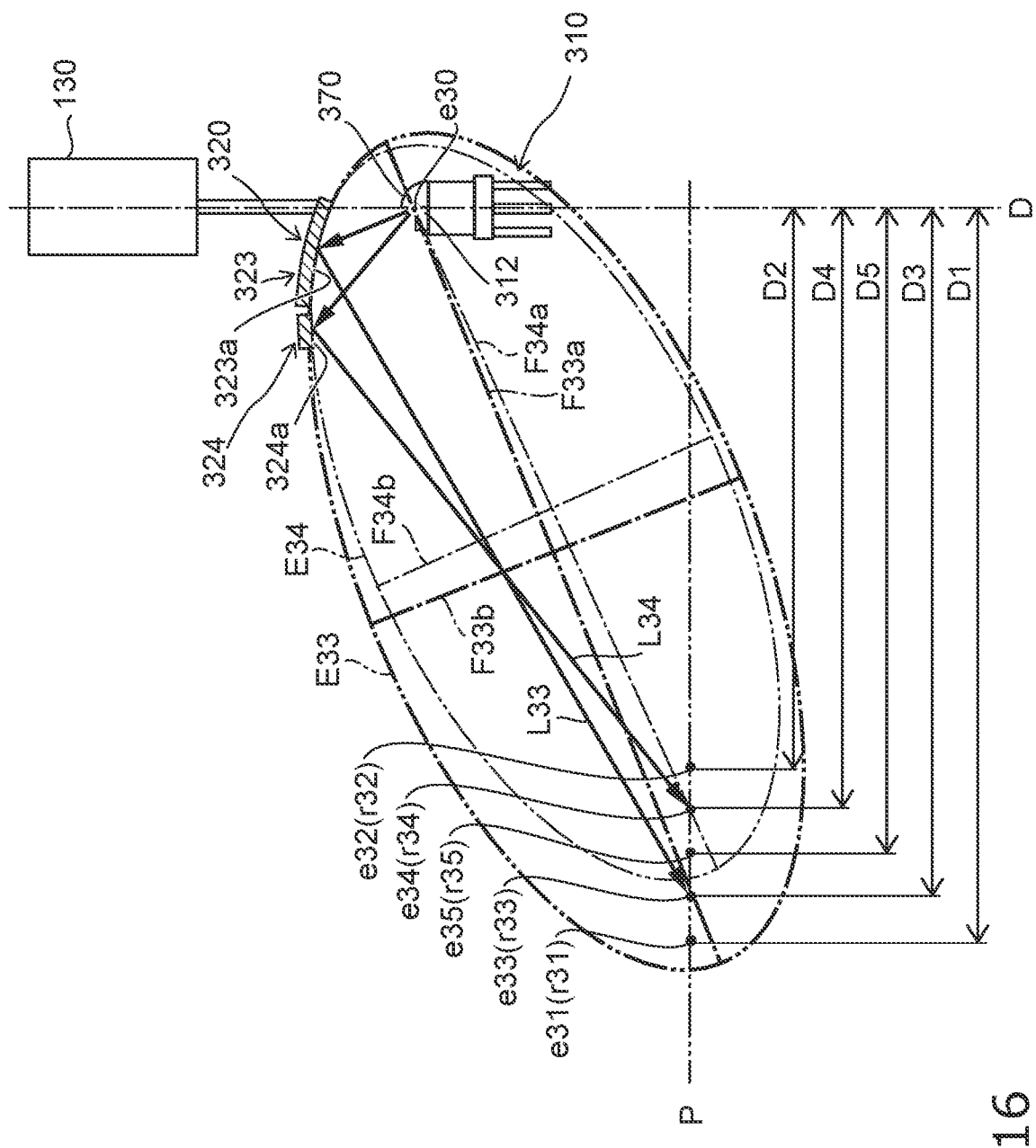
FIG. 16 is a schematic partial cross-sectional view of the lighting device.

FIG. 16 is a schematic partial cross-sectional view of the lighting device.

In FIG. 16, the first reflective portion 321, the second reflective portion 322, the fifth reflective portion 325, and the sixth reflective portion 326 of the reflector 320 are omitted.

The surface of the third reflective portion 323 includes a third reflection surface 323a that receives light emitted from the light source 310. The third reflection surface 323a is a portion of a surface obtained by rotating a third ellipse E33 having a major axis F33a and a minor axis F33b extending in directions inclined with respect to the extension direction of the rotation axis D with the major axis F33a being the central axis.

The third reflection surface 323a is set such that light L33 emitted from the third reflection surface 323a is condensed on the pattern surface P. Specifically, for example, the third reflection surface 323a is disposed along the third ellipse E33 having one focus on the focus e30 of the first ellipse E31 and the other focus e33 on the pattern surface P. The light L33 emitted from the third reflection surface 323a is therefore condensed on the focus e33. Accordingly, a center r33 of the light L33 emitted from the third reflection surface 323a on the pattern surface P is located on the focus c33. The focus e33 is located away from the rotation axis D. The casting direction of the light L33 emitted from the third reflection surface 323a is inclined with respect to the extension direction of the rotation axis D.

The fourth reflective portion 324 is disposed around the third reflective portion 323. The surface of the fourth reflective portion 324 includes a fourth reflection surface 324a that receives light emitted from the light source 310. The fourth reflection surface 324a is a portion of a surface obtained by rotating a fourth ellipse E34 having a major axis F34a and a minor axis F34b extending in directions inclined with respect to the extension direction of the rotation axis D with the major axis F34a being the central axis.

The fourth reflection surface 324a is set such that light L34 emitted from the fourth reflection surface 324a is condensed on the pattern surface P. Specifically, for example, the fourth reflection surface 324a is disposed along the fourth ellipse E34 having one focus on the focus e30 of the first ellipse E31 and the other focus e34 on the pattern surface P. The light L34 emitted from the fourth reflection surface 324a is therefore condensed on the focus e34. Accordingly, a center r34 of the light L34 emitted from the fourth reflection surface 324a on the pattern surface P is located on the focus e34. The focus e34 is located away from the rotation axis D. The casting direction of the light L34 emitted from the fourth reflection surface 324a is inclined with respect to the extension direction of the rotation axis D.

Figure 17:
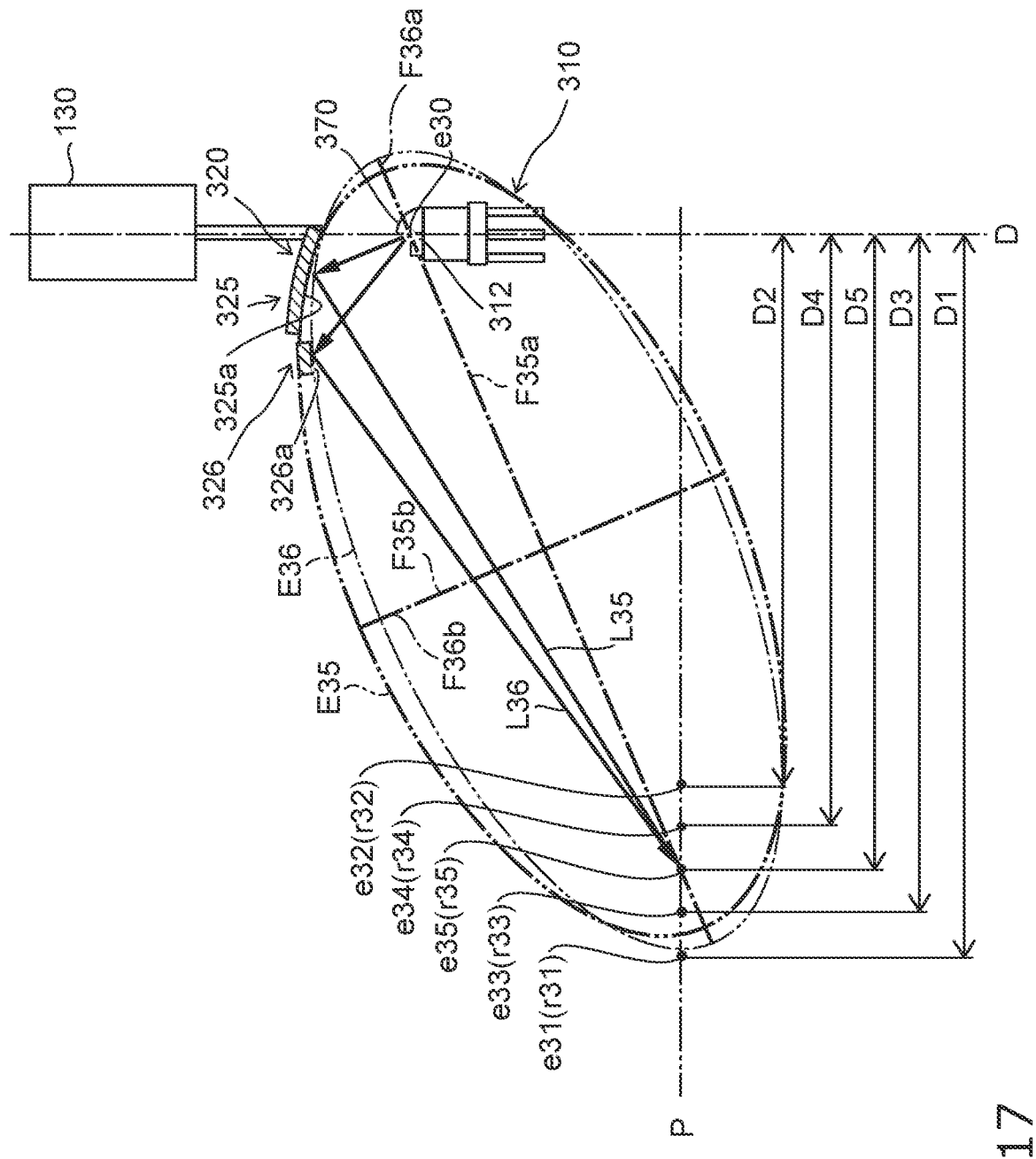
FIG. 17 is a schematic partial cross-sectional view of the lighting device.

FIG. 17 is a schematic partial cross-sectional view of the lighting device.

In FIG. 17, the first reflective portion 321, the second reflective portion 322, the third reflective portion 323, and the fourth reflective portion 324 of the reflector 320 are omitted.

The surface of the fifth reflective portion 325 includes a fifth reflection surface 325a that receives light emitted from the light source 310. The fifth reflection surface 325a is a portion of a surface obtained by rotating a fifth ellipse E35 having a major axis F35a and a minor axis F35b extending in directions inclined with respect to the extension direction of the rotation axis D with the major axis F35a being the central axis.

The fifth reflection surface 325a is set such that light L35 emitted from the fifth reflection surface 325a is condensed on the pattern surface P. Specifically, for example, the fifth reflection surface 325a is disposed along the fifth ellipse E35 having one focus on the focus e30 of the first ellipse E31 and the other focus e35 on the pattern surface P. The light L35 emitted from the fifth reflection surface 325a is therefore condensed on the focus e35. Accordingly, a center r35 of the light L35 emitted from the fifth reflection surface 325a on the pattern surface P is located on the focus e35. The focus e35 is located away from the rotation axis D. The casting direction of the light L35 emitted from the fifth reflection surface 325a is inclined with respect to the extension direction of the rotation axis D.

The sixth reflective portion 326 is disposed around the fifth reflective portion 325. The surface of the sixth reflective portion 326 includes a sixth reflection surface 326a that receives light emitted from the light source 310. The sixth reflection surface 326a is a portion of a surface obtained by rotating a sixth ellipse E36 with a major axis F36a being the central axis. The major axis F36a of the sixth ellipse E36 is parallel to the major axis F35a of the fifth ellipse E35, and a minor axis F36b of the sixth ellipse E36 is parallel to the minor axis F35b of the fifth ellipse F35.

The sixth reflection surface 326a is set such that light L36 emitted from the sixth reflection surface 326a is condensed on the pattern surface P. Specifically, for example, the sixth reflection surface 326a is disposed along the sixth ellipse E36 having one focus on the focus e30 of the first ellipse E31 and the other focus on the focus e35 of the fifth ellipse E35. The light L36 emitted from the sixth reflection surface 326a is therefore condensed on the focus e35. Accordingly, the center of the light L36 emitted from the sixth reflection surface 326a on the pattern surface P is located on the focus e35. The casting direction of the light L36 emitted from the sixth reflection surface 326a is inclined with respect to the extension direction of the rotation axis D.

The positions of the foci e31, e32, e33, e34, and e35 are different from one another. Specifically, the second distance D2 between the center r32 (focus c32) of the light L32 emitted from the second reflection surface 322a and the rotation axis D is shorter than the first distance D1 between the center r31 (focus e31) of the light L31 emitted from the first reflection surface 321a and the rotation axis D. The third distance D3 between the center r33 (focus e33) of the light L33 emitted from the third reflection surface 323a and the rotation axis D is shorter than the first distance D1 and longer than the second distance D2. The fourth distance D4 between the center r34 (focus e34) of the light L34 emitted from the fourth reflection surface 324a and the rotation axis D is shorter than the third distance D3 and longer than the second distance D2. The fifth distance D5 between the center r35 (focus e35) of the light L35 and L36 emitted from the fifth reflection surface 325a and the sixth reflection surface 326a and the rotation axis D is shorter than the third distance D3 and longer than the fourth distance D4. That is, the formula D2<D4<D5<D3<D1 holds. Alternatively, the formula D1<D3<D5<D4<D2 can hold.

Subsequently, operation of the lighting device 300 according to the present embodiment is described.

Figure 18:
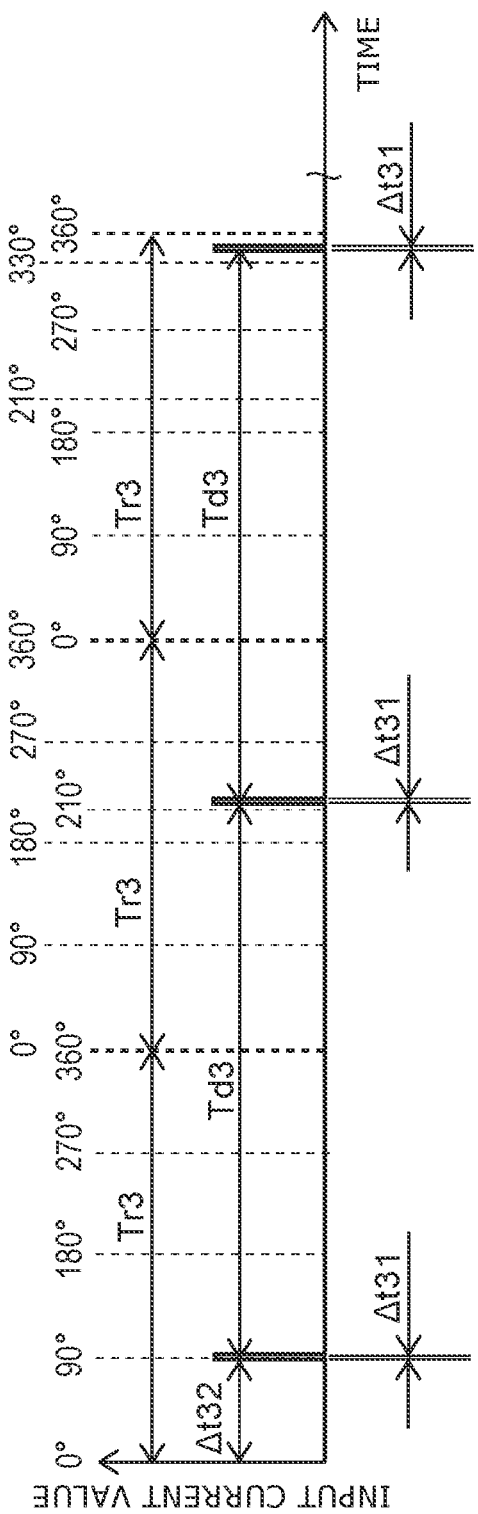
FIG. 18 is a graph showing input signals applied to the light source, with time on the horizontal axis and input current value on the vertical axis.

FIG. 18 is a graph showing input signals applied to the light source, with time on the horizontal axis and input current value on the vertical axis.

Figure 19:
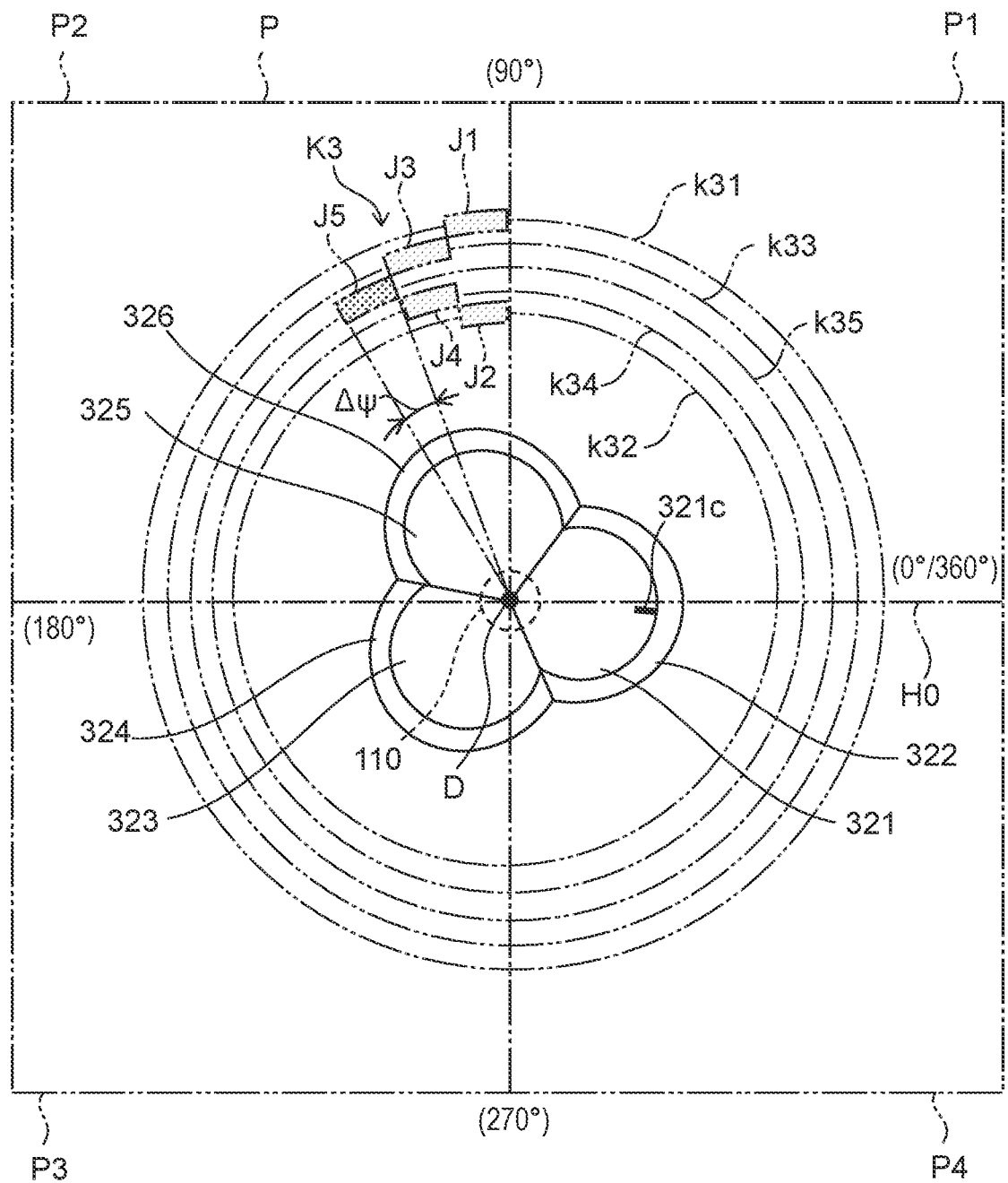
FIG. 19 is a schematic top view of light emitted from the lighting device.

FIG. 19 is a schematic top view of light emitted from the lighting device.

First, the controller 140 controls the actuator 130 to rotate the reflector 320 at a rotation period Tr3.

Subsequently, after a predetermined time Δt32 has elapsed from the timing when the detector 150 has detected that the mark 321c has reached the reference line H0, while rotating the reflector 320, the controller 140 inputs pulsed current to the light source 310 such that the light source 310 is turned on for a lighting period Td3.

The predetermined time Δt32 is, for example, the time required for the rotation angle ψ of the reflector 320 to change from 0° to 90°. The controller 140 keeps the light source 310 on over a time Δt31 shorter than the rotation period Tr3 of the reflector 320 every lighting period Td3 (that is, Δt31<Tr3).

The lighting period Td3 is longer than the rotation period Tr3 (that is, Td3>Tr3). Specifically, Td3 is the sum of the time taken by the reflector 320 to be rotated 120° and the time Δt31.

In the case in which the actuator 130 rotates the reflector 320 with the light source 310 on, the light L31 emitted from the first reflection surface 321a moves on a first circumference k31 of a circle centered on the rotation axis D on the pattern surface P. Likewise, the light L32 emitted from the second reflection surface 322a moves on a second circumference k32 of a circle that is centered on the rotation axis D on the pattern surface P and has a radius smaller than the radius of the first circumference k31. Likewise, the light L33 emitted from the third reflection surface 323a moves on a third circumference k33 of a circle that is centered on the rotation axis D on the pattern surface P and has a radius smaller than the radius of the first circumference k31 and larger than the radius of the second circumference k32. Likewise, the light L34 emitted from the fourth reflection surface 324a moves on a fourth circumference k34 of a circle that is centered on the rotation axis D on the pattern surface P and has a radius smaller than the radius of the third circumference k33 and larger than the radius of the second circumference k32. Likewise, the light L35 and L36 emitted from the fifth reflection surface 325a and the sixth reflection surface 326a moves on a fifth circumference k35 of a circle that is centered on the rotation axis D on the pattern surface P and has a radius smaller than the radius of the third circumference k33 and larger than the radius of the fourth circumference k34.

Accordingly, in the first rotation, the light source 310 is kept on while the rotation angle ψ of the reflector 320 is in the range of 90° or more and less than (90+Δψ)°, and the light source 310 is kept off while the rotation angle ψ is out of this range as shown in FIG. 19. At this time, the first reflective portion 321 and the second reflective portion 322 are mainly located in the second quadrant P2 in a top view. Accordingly, light emitted from the light source 310 is mainly incident on the first reflective portion 321 and the second reflective portion 322, and incidence of the light on the other reflective portions 323, 324, 325, and 326 is reduced. Light emitted from the first reflection surface 321a is cast on the region J1 in the second quadrant P2. Light emitted from the second reflection surface 322a is cast on the region J2 located inward of the region J1 in a direction toward the rotation axis D in the second quadrant P2.

In the second rotation, the light source 310 is kept on while the rotation angle ψ of the reflector 320 is in the range of (210+Δψ)° or more and less than (210+2×Δψ)°, and the light source 310 is kept off while the rotation angle ψ is out of this range. At this time, the third reflective portion 323 and the fourth reflective portion 324 are mainly located in the second quadrant P2 in a top view. Accordingly, light emitted from the light source 310 is mainly incident on the third reflective portion 323 and the fourth reflective portion 324, and incidence of the light on the other reflective portions 321, 322, 325, and 326 is reduced. Light emitted from the third reflection surface 323a is cast on a region J3 in the second quadrant P2. Light emitted from the fourth reflection surface 324a is cast on a region J4 located inward of the region J3 in a direction toward the rotation axis D in the second quadrant P2.

In the third rotation, the light source 310 is kept on while the rotation angle ψ of the reflector 320 is in the range of (330+2×Δψ)° or more and less than (230+3×Δψ)°, and the light source 310 is kept off while the rotation angle ψ is out of this range. At this time, the fifth reflective portion 325 and the sixth reflective portion326 are mainly located in the second quadrant P2 in a top view. Accordingly, light emitted from the light source 310 is mainly incident on the fifth reflective portion 325 and the sixth reflective portion 326, and incidence of the light on the other reflective portions 321, 322, 323, and 324 is reduced. Light emitted from the fifth reflection surface 325a and the sixth reflection surface 326a is cast on a region J5 in the second quadrant P2.

At this time, the light cast on the pattern surface P in the first and second rotations is visually recognized by a human as afterimages. Accordingly, an arrow-shaped pattern K3 defined by the regions J1, J2, J3, J4, and J5 is sequentially formed in the second quadrant P2. The regions J1, J2, J3, J4, and J5 are arranged in a V shape to form a V-shaped arrow.

After the arrow-shaped pattern K3 is formed by three rotations of the reflector 320, the controller 140 performs substantially the same control as in the first to third rotations again to form the arrow-shaped pattern K3 again. For example, the arrow-shaped pattern K3 can be used in conjunction with a direction indicator.

Subsequently, the effects of the present embodiment are described.

The reflector 320 further has the third reflection surface 323a that is located at a position different from the position of the first reflection surface 321a in the circumferential direction centered on the rotation axis D, concave recessed toward the direction away from the light source 310, and configured to receive light emitted from the light source 310. The casting direction of the light L33 emitted from the third reflection surface 323a is inclined with respect to the extension direction of the rotation axis D. On a plane (pattern surface P) orthogonal to the rotation axis D, the third distance D3 between the center r33 of light emitted from the third reflection surface 323a and the rotation axis D differs from the first distance D1 between the center r31 of light emitted from the first reflection surface 321a and the rotation axis D (that is, D3≠D1). Accordingly, the lighting device 300 can form two types of arc shapes having different diameters.

The reflector 320 further has the fourth reflection surface 324a and the fifth reflection surface 325a. The fourth reflection surface 324a is disposed around the third reflection surface 323a, concave recessed toward the direction away from the light source 310, and configured to receive light emitted from the light source 310. The fifth reflection surface 325a is located at a position different from the positions of the first reflection surface 321a and the third reflection surface 323a in the circumferential direction, concave recessed toward the direction away from the light source 310, and configured to receive light emitted from the light source 310. The casting direction of the light L34 emitted from the fourth reflection surface 324a and the casting direction of the light L35 emitted from the fifth reflection surface 325a are inclined with respect to the extension direction of the rotation axis D. On the pattern surface P, the first distance D the second distance D2, the third distance D3 (between the center r33 of the light L33 emitted from the third reflection surface 323a and the rotation axis D), the fourth distance D4 (between the center r34 of the light L34 emitted from the fourth reflection surface 324a and the rotation axis D), and the fifth distance D5 (between the center r35 of the light L35 emitted from the fifth reflection surface 325a and the rotation axis D) differ from one another. Accordingly, the lighting device 300 can form five types of arc shapes having different diameters.

On the pattern surface P, the center r33 of the light L33 emitted from the third reflection surface 323a and the center r34 of the light L34 emitted from the fourth reflection surface 324a are located between a circle centered on the rotation axis D while having a radius equal to the first distance D1 and a circle centered on the rotation axis D while having a radius equal to the second distance D2. On the pattern surface P, the center r35 of the light L35 emitted from the fifth reflection surface 325a is located between a circle centered on the rotation axis D while having a radius equal to the third distance D3 and a circle centered on the rotation axis D while having a radius equal to the fourth distance D4. Accordingly, the lighting device 300 can form the arrow-shaped pattern K3 by timing on the light source 310 such that light is cast on the first reflection surface 321a and the second reflection surface 322a, then on the third reflection surface 323a and the fourth reflection surface 324a, and then on the fifth reflection surface 325a.

The first reflection surface 321a, the third reflection surface 323a, and the fifth reflection surface 325a are arranged at a regular interval in the circumferential direction. Accordingly, a structure that is kept in balance when the reflector 320 is rotated can be obtained.

The lighting device 300 further includes the reflective member 370 between the light source 310 and the reflector 320. The reflective member 370 has the first mirror surface 373 and the second mirror surface 374. The first mirror surface 373 is a flat surface parallel to the extension direction of the rotation axis D and the first direction Y orthogonal to the extension direction of the rotation axis D and receives light emitted from the light source 310. The second mirror surface 374 is a flat surface in contact with the first mirror surface 373 and parallel to the extension direction of the rotation axis D and the second direction X orthogonal to the extension direction of the rotation axis D and intersecting the first direction Y and receives light emitted from the light source 310. Distribution of light emitted from the light source 310 can therefore be controlled.

The light source 310 includes the light-emitting element 311 and the wavelength conversion member 312 that is disposed above the light-emitting element 311 and has lateral surfaces in contact with the first mirror surface 373 and the second mirror surface 374. Distribution of light emitted from the light source 310 can therefore be more precisely controlled.

Fourth Embodiment

Subsequently, a fourth embodiment is described.

Figure 20:
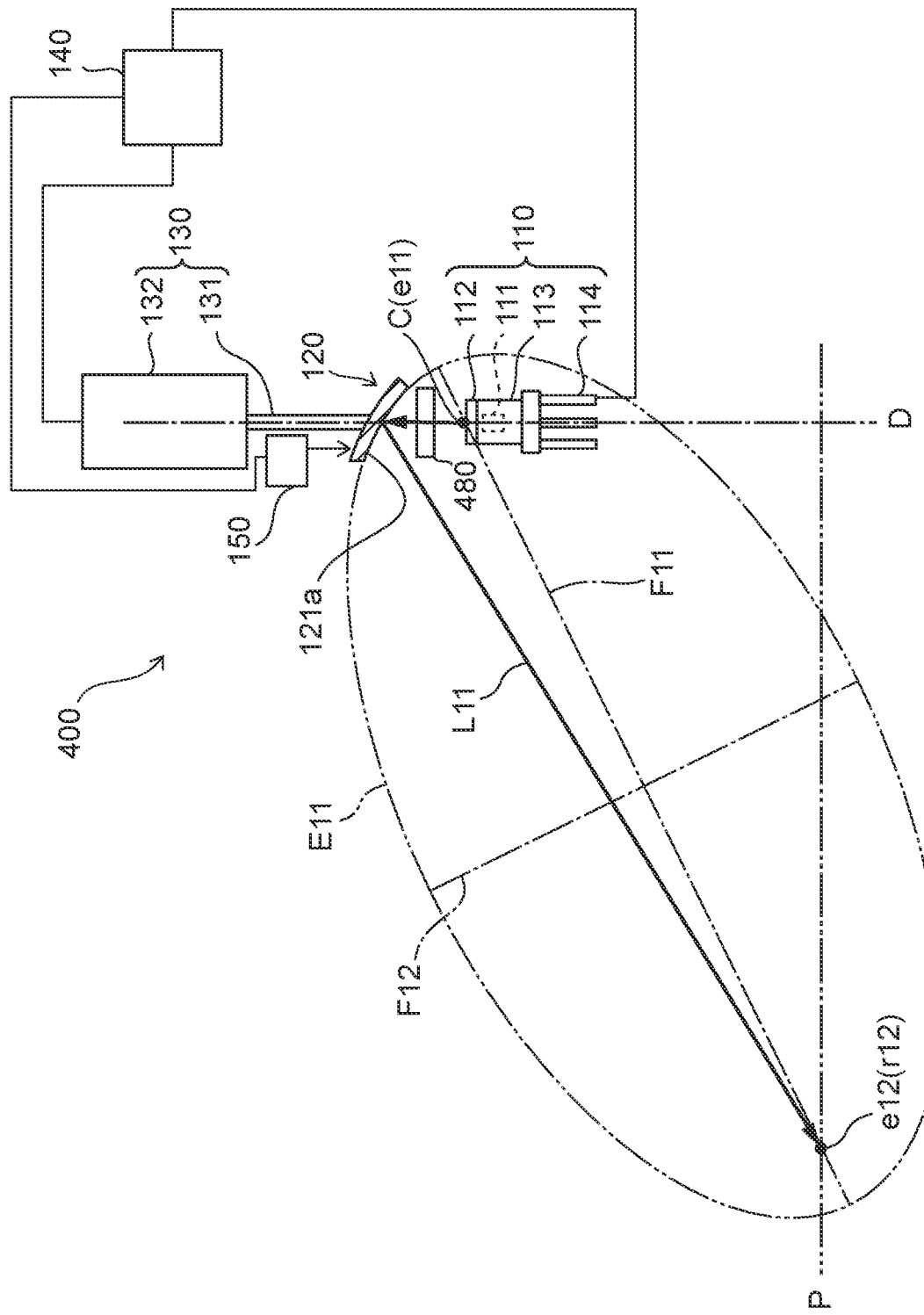
FIG. 20 is a schematic partial cross-sectional view of an lighting device according to a fourth embodiment.

FIG. 20 is a schematic cross-sectional view of an lighting device according to the present embodiment.

An lighting device 400 according to the present embodiment s different in that a collimating optical system 480 is disposed between the light source 110 and the reflector 120.

The collimating optical system 480 is, for example, a combination of a plurality of lenses. In FIG. 20, the collimating optical system 480 is schematically shown as a quadrangle.

With such a structure, collimated light is incident on the reflector 120. The reflector 120 condenses the collimated light, so that the light extraction efficiency of the lighting device 400 can be enhanced. Further, the size of the reflector 120 can be reduced.

The present disclosure can be used for, for example, vehicle lights.

The invention claimed is:

1. An lighting device comprising:
   a light source;
   a reflector having a first reflection surface that is curved in a concave shape, and configured to receive light emitted from the light source;
   an actuator configured to rotate the reflector with an axis passing through the light source being a rotation axis; and
   a controller configured to keep the light source on over a time shorter than a rotation period of the reflector according to a rotation angle of the reflector while controlling the actuator to rotate the reflector,
   wherein a casting direction of light emitted from the first reflection surface is inclined with respect to an extension direction of the rotation axis.

2. The lighting device according to claim 1,
   wherein the reflector further has a second reflection surface around the first reflection surface, the second reflection surface being curved in a concave shape, and configured to receive the light emitted from the light source,
   wherein a casting direction of light emitted from the second reflection surface is inclined with respect to the extension direction of the rotation axis, and
   wherein, on a plane orthogonal to the rotation axis, a first distance between a center of the light emitted from the first reflection surface and the rotation axis differs from a second distance between a center of the light emitted from the second reflection surface and the rotation axis.

3. The lighting device according to claim 1,
   wherein the reflector further has a third reflection surface located at a position different from a position of the first reflection surface in a circumferential direction centered on the rotation axis, is curved in a concave shape, and configured to receive the light emitted from the light source,
   wherein a casting direction of light emitted from the third reflection surface is inclined with respect to the extension direction of the rotation axis, and
   wherein, on a plane orthogonal to the rotation axis, a third distance between a center of the light emitted from the third reflection surface and the rotation axis is equal to a first distance between a center of the light emitted from the first reflection surface and the rotation axis.

4. The lighting device according to claim 2,
   wherein the reflector further has:
      a third reflection surface located at a position different from a position of the first reflection surface in a circumferential direction centered on the rotation axis, curved in a concave shape, and configured to receive the light emitted from the light source; and
      a fourth reflection surface around the third reflection surface, the fourth reflection surface being curved in a concave shape, and configured to receive the light emitted from the light source,
   wherein a casting direction of light emitted from the third reflection surface and a casting direction of light emitted from the fourth reflection surface are inclined with respect to the extension direction of the rotation axis, and
   wherein, on the plane, a third distance between a center of the light emitted from the third reflection surface and the rotation axis is equal to the first distance, and a fourth distance between a center of the light emitted from the fourth reflection surface and the rotation axis is equal to the second distance.

5. The lighting device according to claim 3, wherein the first reflection surface and the third reflection surface are arranged at a regular interval in the circumferential direction.

6. The lighting device according to claim 1,
   wherein the reflector further has a third reflection surface located at a position different from a position of the first reflection surface in a circumferential direction centered on the rotation axis, is curved in a concave shape, and is configured to receive the light emitted from the light source,
   wherein a casting direction of light emitted from the third reflection surface is inclined with respect to the extension direction of the rotation axis, and
   wherein, on a plane orthogonal to the rotation axis, a third distance between a center of the light emitted from the third reflection surface and the rotation axis differs from a first distance between a center of the light emitted from the first reflection surface and the rotation axis.

7. The lighting device according to claim 2,
   wherein the reflector further has:
      a third reflection surface located at a position different from a position of the first reflection surface in a circumferential direction centered on the rotation axis, curved in a concave shape, and configured to receive the light emitted from the light source;
      a fourth reflection surface around the third reflection surface, the fourth reflection surface being curved in a concave shape and configured to receive the light emitted from the light source; and
      a fifth reflection surface located at a position different from the positions of the first reflection surface and the third reflection surface in the circumferential direction, curved in a concave shape, and configured to receive the light emitted from the light source,
   wherein a casting direction of light emitted from the third reflection surface, a casting direction of light emitted from the fourth reflection surface, and a casting direction of light emitted from the fifth reflection surface are inclined with respect to the extension direction of the rotation axis, and
   wherein, on the plane, the first distance, the second distance, a third distance between a center of the light emitted from the third reflection surface and the rotation axis, a fourth distance between a center of the light emitted from the fourth reflection surface and the rotation axis, and a fifth distance between a center of the light emitted from the fifth reflection surface and the rotation axis differ from one another.

8. The lighting device according to claim 7,
   wherein, on the plane, the center of the light emitted from the third reflection surface and the center of the light emitted from the fourth reflection surface are located between a circle being centered on the rotation axis while having a radius equal to the first distance and a circle being centered on the rotation axis while having a radius equal to the second distance, and
   wherein the center of the light emitted from the fifth reflection surface is located between a circle being centered on the rotation axis while having a radius equal to the third distance and a circle being centered on the rotation axis while having a radius equal to the fourth distance.

9. The lighting device according to claim 7, wherein the first reflection surface, the third reflection surface, and the fifth reflection surface are arranged at a regular interval in the circumferential direction.

10. The lighting device according to claim 1, further comprising a reflective member between the light source and the reflector,
wherein the reflective member has:
a flat first mirror surface parallel to the extension direction of the rotation axis and a first direction orthogonal to the extension direction of the rotation axis, the first mirror surface configured to receive the light emitted from the light source; and
a flat second mirror surface having a configuration of:
being in contact with the first mirror surface,
being parallel to the extension direction of the rotation axis and a second direction orthogonal to the extension direction of the rotation axis and intersecting the first direction, and
receiving the light emitted from the light source.

11. The lighting device according to claim 10, wherein the light source comprises:
a light-emitting element; and
a wavelength conversion member on or above the light-emitting element, the wavelength conversion member having at least one lateral surface in contact with the first mirror surface and the second mirror surface.

12. The lighting device according to claim 1, wherein the first reflection surface is a portion of a surface obtained by rotating a curved line with an axis extending in a direction inclined with respect to the extension direction of the rotation axis being a central axis.

13. The lighting device according to claim 1, wherein, in a section comprising the rotation axis, the first reflection surface is a portion of an ellipse having a major axis and a minor axis extending in directions inclined with respect to the extension direction of the rotation axis.

14. The lighting device according to claim 1, wherein the controller keeps the light source on over a time shorter than the rotation period of the reflector every rotation of the reflector while controlling the actuator to allow the reflector to experience a plurality of rotations to gradually change the rotation angle of the reflector at a timing when the light source is turned on.

15. The lighting device according to claim 1, further comprising a collimating optical system between the light source and the reflector.

16. A vehicle comprising the lighting device according to claim 1.

17. A method of casting light, comprising:
keeping a light source on over a time shorter than a rotation period of a reflector according to a rotation angle of the reflector while rotating the reflector with an axis passing through the light source being a rotation axis, wherein
the reflector has a first reflection surface that is curved in a concave shape and configured to receive light emitted from the light source,
wherein a casting direction of light emitted from the first reflection surface is inclined with respect to an extension direction of the rotation axis.

* * * * *